(12) United States Patent
Hyodo et al.

(10) Patent No.: US 11,185,758 B2
(45) Date of Patent: Nov. 30, 2021

(54) GAME CONSOLE APPLICATION WITH ACTION CARDS

(71) Applicant: SONY INTERACTIVE ENTERTAINMENT INC., Tokyo (JP)

(72) Inventors: Katsuya Hyodo, San Mateo, CA (US); Daisuke Kawamura, Foster City, CA (US); Kohichi Aoki, San Francisco, CA (US); Joseph B. Lynch, San Mateo, CA (US); Ken Yoshihiko Hirakawa, Tokyo (JP); Daniel Morales, Discovery Bay, CA (US); Robert Eldon Brown, Lafayette, CA (US); Toru Yamamoto, San Mateo, CA (US); Satoshi Kobayashi, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/807,968

(22) Filed: Mar. 3, 2020

(65) Prior Publication Data
US 2021/0275899 A1    Sep. 9, 2021

(51) Int. Cl.
*A63F 1/04* (2006.01)
*A63F 13/537* (2014.01)
*A63F 13/79* (2014.01)

(52) U.S. Cl.
CPC .............. *A63F 1/04* (2013.01); *A63F 13/537* (2014.09); *A63F 13/79* (2014.09)

(58) Field of Classification Search
None
See application file for complete search history.

(56) References Cited

U.S. PATENT DOCUMENTS

| | | |
|---|---|---|
| 6,976,028 B2 | 12/2005 | Fenton et al. |
| 9,412,236 B2 | 8/2016 | Earley et al. |
| 9,731,207 B2 | 8/2017 | Guthridge et al. |

(Continued)

FOREIGN PATENT DOCUMENTS

| | | |
|---|---|---|
| WO | 2014197340 | 12/2014 |
| WO | 2015066658 | 5/2015 |
| WO | 2019112631 | 6/2019 |

OTHER PUBLICATIONS

Application No. PCT/US2021/019408, International Search Report and Written Opinion, dated Jun. 1, 2021, 15 pages.

(Continued)

*Primary Examiner* — Ronald Laneau
(74) *Attorney, Agent, or Firm* — Kilpatrick Townsend & Stockton LLP

(57) ABSTRACT

A computer system including a content monitoring service of a menu application is provided. The content monitoring service pre-fetches data for a target application based on a data template defined for the target application, and stores the pre-fetched data in a cache of the menu application. The menu application presents a window in a first presentation state, where the window corresponds to the target application and includes content based on the pre-fetched data in the cache. The computer system further includes a window application that, upon a user selection of the window, receives a copy of the pre-fetched data from the cache and presents the window in a second state based on the data template.

22 Claims, 13 Drawing Sheets

(56) References Cited

U.S. PATENT DOCUMENTS

| | | | |
|---|---|---|---|
| 9,761,035 B1* | 9/2017 | Flores | G06F 3/04845 |
| 10,290,133 B2 | 5/2019 | Straub | |
| 10,460,023 B1 | 10/2019 | Shriver | |
| 2006/0286534 A1 | 12/2006 | Tillis et al. | |
| 2007/0094698 A1 | 4/2007 | Bountour et al. | |
| 2008/0109472 A1 | 5/2008 | Underwood et al. | |
| 2009/0019349 A1 | 1/2009 | Lee | |
| 2009/0031215 A1 | 1/2009 | Collier, II et al. | |
| 2009/0037821 A1* | 2/2009 | O'Neal | G06F 16/4393 |
| | | | 715/732 |
| 2009/0046584 A1 | 2/2009 | Garcia et al. | |
| 2011/0196752 A1 | 8/2011 | Paulik et al. | |
| 2012/0079418 A1 | 3/2012 | Lindsay et al. | |
| 2012/0089933 A1 | 4/2012 | Garand et al. | |
| 2014/0019847 A1 | 1/2014 | Osmak | |
| 2014/0089826 A1 | 3/2014 | Boyd | |
| 2014/0195921 A1 | 7/2014 | Grosz et al. | |
| 2014/0229821 A1 | 8/2014 | Abrahami | |
| 2015/0120744 A1 | 4/2015 | Horn | |
| 2016/0103601 A1 | 4/2016 | Steinfl et al. | |
| 2017/0300459 A1 | 10/2017 | Luo et al. | |
| 2017/0308518 A1 | 10/2017 | Sjolander et al. | |
| 2017/0329500 A1 | 11/2017 | Grammatikakis et al. | |
| 2018/0295421 A1 | 10/2018 | Lim et al. | |
| 2018/0300020 A1 | 10/2018 | Dyar et al. | |
| 2019/0050378 A1* | 2/2019 | Novak | G06F 40/169 |
| 2019/0050440 A1* | 2/2019 | Novak | G06F 16/235 |
| 2019/0339918 A1 | 11/2019 | Boule et al. | |

OTHER PUBLICATIONS

Application No. PCT/US2021/019415, International Search Report and Written Opinion, dated Jun. 7, 2021, 13 pages.
Application No. PCT/US2021/019430, International Search Report and Written Opinion, dated Jun. 4, 2021, 19 pages.

* cited by examiner

US 11,185,758 B2

GAME CONSOLE APPLICATION WITH ACTION CARDS

BACKGROUND OF THE INVENTION

Graphical user interfaces (GUIs) are the predominant type of interfaces available to users for interacting with computer systems. A GUI includes selectable icons to launch applications. Typically, upon a launch of a first application, the first application is presented in a first window. Upon a launch of a second application, a second window is used and the user control shifts from the first window to the second one. In addition, dynamic content (e.g., interactive media content) presented in the first window may be paused. If the user desires to interact with the first application, additional user input is needed to shift the control from the second window back to the first one.

To illustrate, consider an example of a GUI of a video game system hosting a video game application and a music streaming application. The GUI presents a home page that includes a video game icon and a music streaming icon. From this home page, a video game player selects the video game icon to launch the video game application. Video game content is then presented in the GUI. To stream music, the video game player may need to pause the execution of the video game application, switch back to the home page, and select the music streaming icon. Upon this selection, the music streaming application is launched and music can be played over speakers of the video game system. To resume the video game, the video game player may need to minimize the window of the music streaming application, switch back to the home page, expand the window of the video game application, and un-pause the video game content.

Hence, although a GUI can be an effective user interface, switching between applications may not be seamless and the presentation of information may be limited to an active window. There is a need for an improved GUI that allows better information sharing and control switching.

BRIEF SUMMARY OF THE INVENTION

Embodiments of the present disclosure relate to techniques for better information sharing and control switching in a graphical user interface (GUI).

DETAILED DESCRIPTION OF THE INVENTION

Figure 1:
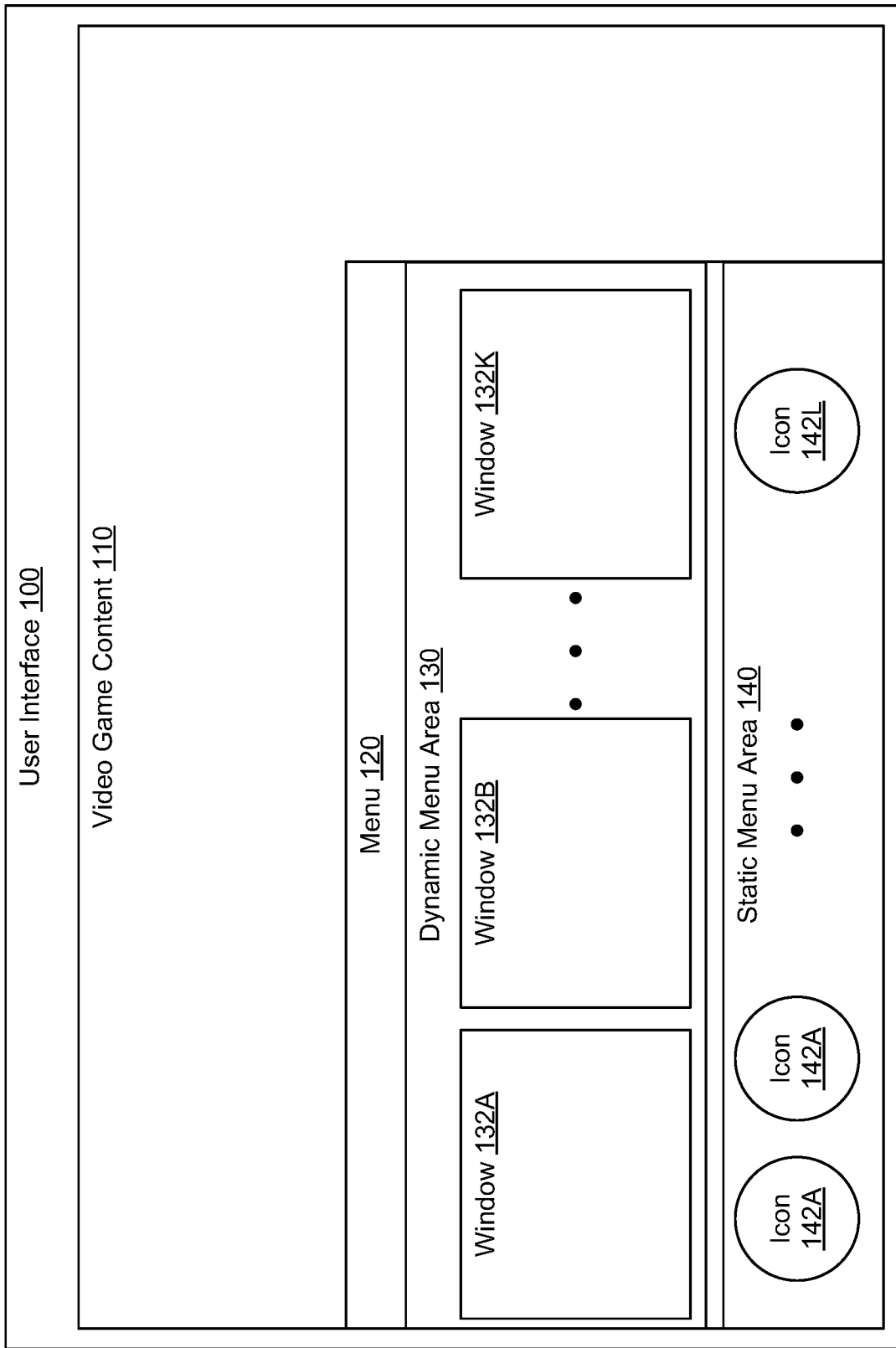
FIG. 1 illustrates an example of a menu with selectable actions, according to an embodiment of the present disclosure.

Generally, systems and methods for better information sharing and control switching in a graphical user interface (GUI) are described. In an example, a computer system presents a GUI on a display. Upon an execution of a first application, first content of the first application is presented in the GUI. Upon user input requesting a menu, the menu is presented in a layer over at least a portion of the first content based on an execution of a menu application. The menu includes a dynamic area (also referred to as an interactive menu) that presents a plurality of windows and a static area that presents icons. Each of the windows corresponds to a different application. Each of the icons can be preset and can correspond to system function of the computer system or to a window of an application. The dynamic menu area shows the windows in a first presentation state (e.g., glanced state), where each window presents content in this presentation state. Upon user interactions with the dynamic menu area, the presentation of the windows can change to a second presentation state (e.g., focused state), where a window in the second state and its content are resized and where an action performable on the content can be selected. Upon a user selection of the window in the second state, the presentation of the window changes to a third presentation state (e.g., expanded state), where the windows and its content are resized again and where an action performable on the window can be further selected. Upon a user selection of the window action or the content action, the selected action is performed and user control is automatically switched back to the first application.

In a further example, implementing the above UI functions via the GUI is a computer system executing one or more applications for generating and/or presenting windows in one of the presentation states in the interactive menu (dynamic menu area). For instance, the computer system executes a menu application, including a content monitoring service that pre-fetches and/or receives data including content for presentation in the plurality of windows. The menu application uses data templates associated with a plurality of applications running on the computer systems to determine content for each window. Additionally, the menu application provides UI data to generate the plurality of windows, where each window corresponds to a different application. Each window in the interactive menu is updated by the menu application when new data is available. The menu application also sends copies of data to a window application to provide UI data for generating windows in the third presentation state, which are also updated with new data when available. The content monitoring service uses the templates to pre-fetch and store the data in the cache of the menu app. Upon a user request for the menu, the menu app presents the menu including the windows in the first or second states and populates windows in the menu with the data from the cache. Upon a user selection of a particular window, the menu app provides copy of the data to a window app. the window app presents the window in the third state given the data.

To illustrate, consider an example of a video game system. The video game system can host a menu application, a video game application, a music streaming application, a video streaming application, a social media application, a chat application (e.g., a "party chat" application), and multiple other applications. A video game player can login to the video game system and a home user interface is presented thereto on a display. From this interface, the video game player can launch the video game application and video game content can be presented on the display. While the video game application is active and video game content is occupying the display, a content monitoring service may pre-fetch and cache application data associated with the applications, including the video game application. Upon a user button push on a video game controller, a menu can be presented in a layer at the bottom of the display based on an execution of the menu application. The menu is populated with the application data stored in the cache, using a data template for each application that defines the data and arrangement of UI elements for a window associated with each application in the menu. The menu includes a game window that corresponds to the video game application and that presents content based on a context of a game play (e.g., presents an invitation to a car race tournament when the video game player is playing a car race game and is about to finish a current car race). The menu also includes a music window that corresponds to the music streaming application and that presents a music album from a music library of the video game player. The layer can present the menu in the foreground, while the execution of the video game application and the presentation of the video game content continue (e.g., the video game content can be continuously updated in the background showing the progress in the current car race). The windows within the dynamic area of the menu are shown in a glanced state, providing sufficient information to the video game player about the applications (e.g., to perceive the car race invitation and to see a cover of the music album). Upon a user key push on a video game controller, a scroll through the presented windows is performed, where only one of the windows is shown in a focused state at a time and remaining windows are shown in the glanced state. For instance, upon the user focus (e.g., the user scroll) being on the music window, that window is expanded to show a partial list of music files and to present a play key. If the play key is selected, the music stream starts, the music is played in the background, and the user control automatically switches back to the video game content such that the user can continue their game play (e.g., steer the car in the current car race). If the user selects the music window rather than the play key, the music window is further expanded to show the full list of the music files. Selecting the music window in this way prompts a copy of the relevant data from the cache to be used to populate the music window in the third presentation state (e.g., expanded state). In general, such techniques improve responsiveness of the GUI, by pre-fetching and caching application data, updated menu data is available immediately upon request for the menu. Furthermore, perceived latency in menu presentation, especially between presentation states, is reduced by providing a second presentation state between a first presentation state presenting limited data and a third presentation state presenting detailed data. The second presentation state (e.g., focused state) imparts a more seamless and fluid interaction with the menu by focusing system resources on only one application menu, and preventing rapid scrolling through windows in the third presentation state.

Embodiments of the present disclosure provide several advantages over existing GUIs and their underlying computer systems. For example, by selecting windows for presentation in a dynamic menu area, relevant application information can be surfaced to a user. By presenting these windows in different presentation states (e.g., glanced, focused, and expanded states) based on the user focus, the interactivity of the windows can be affined to the user focus (e.g., glance, focus, selection). In addition, the execution of any underlying application and the presentation of content of this application may not be interrupted and the user control can be automatically switched back to the application. Hence, the overall GUI allows seamless switching while improving the information sharing.

In the interest of clarity of explanation, the embodiments may be described in connection with a video game system. However, the embodiments are not limited as such and similarly apply to any other type of a computer system. Generally, a computer system presents a GUI on a display. The GUI may include a home user interface from which different applications of the computer system can be launched. Upon a launch of an application, a window that corresponds to the application can be presented in the GUI. Upon a user request for a menu, a menu that includes a dynamic area and a static area can be displayed over the application's window. Applications of interest can be glanced at, focused, and/or selected from the menu, in addition to the selection of system controls. The menu can be dismissed and the user control can be automatically switched back to the application.

FIG. 1 illustrates an example of a menu with selectable actions, according to an embodiment of the present disclosure. As illustrated, a graphical user interface 100 of a computer system (e.g., a video game system) is presented on a display. The GUI 100 presents video game content 110 of a video game application of the computer system (e.g., one executed by the video game system) and a menu 120 of a menu application of the computer system (e.g., one executed by the video game system). The menu 120 can be presented over at least a portion of the video game content 110 such that to appear in the foreground of the GUI 100 while the video game content 110 appears in the background of the GUI 100. For instance, the menu 120 and the video game content 110 are displayed within a menu window and a content window, respectively, where the menu window is shown in a layer that is over the content window and that overlaps with only a portion of the content window.

In an example, the menu 120 can occlude the portion of the video content 110 behind it or can have some degree of transparency. Additionally or alternatively, the texturing and/or brightness of the menu 120 and the video game content 110 can be set such that the menu 120 appears in the foreground and the video game content 110 appears in the background.

As illustrated, the menu 120 includes a dynamic menu area 130 and a static menu area 140. The dynamic menu area 130 presents a plurality of windows 132A, 132B, . . . , 132K, each of which corresponds to an application of the computer system. The static menu area 140 presents icons 142A, 142B, . . . , 142L, each of which corresponds to a system function (e.g., power on, volume control, mute and unmute, etc.) or an application of the computer system. For brevity, each of the windows 132A, 132B, . . . , 132K is referred to herein as a window 132 and each of the icons 142A, 142B, . . . , 142L is referred to as an icon 142. By containing the two areas 130 and 140, the menu 120 represents a dashboard that shows contextually relevant features and relevant system functions without necessitating the user to exit their game play.

Generally, a window 132 can be added to the dynamic menu area 130 based on a context of a user of the computer system (e.g., a video game player) and/or a context of an application being executed on the computer system. A context of the user (user context) generally includes any of information about the user, an account of the user, active background applications and/or services, and/or applications and/or services available to the user from the computer system or from other network environment (e.g., from a social media platform). A context of the application (application context) generally includes any of information about the application, status of the application (active or inactive), specific content shown by the application, and/or a specific state of the application (active in the background, resumed by the system, etc.). For instance, the context of a video game player can include video game applications, music streaming applications, video streaming applications, social media feeds that the video game player has subscribed to and similar contexts of friends of the video game player. The context of a video game application includes the game title, the game level, a current game frame, an available level, an available game tournament, an available new version of the video game application, and/or a sequel of the video game application.

In comparison, the static menu area 140 may not offer the dynamicity of the dynamic menu area 130. Instead, the icons 142 can be preset in the static menu area 140 based on system settings and/or user settings. Upon a selection of an icon 142, a corresponding window (e.g., for a system control or for a particular background application) can be presented. The menu 120 can be dismissed while the window is presented, or alternatively, the presentation of the menu 120 persists.

The content, interactivity, and states of the windows 132 are further described in connection with the next figures. Generally, upon the presentation of the menu 120, the execution of the video game application and the presentation of the video game content 110 continue. Meanwhile, user input from an input device (e.g., from a video game controller) can be received and used to interact with the menu 120 in the dynamic area 130 and/or the static area 140. The dynamic area interactions allow the user to view windows 132 in different states, and select and perform actions on the content of the windows 132 or the windows 132 themselves. The static area interactions allow the user to select any of the icons 142 to update the system functions (e.g., change the volume) or launch a preset window for a specific application (e.g., launch a window for a music streaming application). Once the interactions end, the menu 120 is dismissed and the user control automatically switches to the video game application (e.g., without input of the user explicitly and/or solely requesting the switch). Alternatively, the switch may not be automatic and may necessitate the relevant user input to change the user control back to the video game application. In both cases, user input received from the input device can be used to interact with the video game content 110 and/or the video game application.

In an illustration, a user request is received to present the menu 120 and the menu 120 is presented accordingly over the video game content 110. Accordingly, the dynamic area 130 includes a music window (e.g., the first window 132A) corresponding to the music streaming application and a game window (e.g., the second window 132B) corresponding to the video game application. The music window may show, in a glanced state, a cover of a music album owned by the user. The game window may show, in the glanced state, an invitation to the game tournament. Upon a user scroll, the user focus on the windows 132 is updated. In particular, when the user scroll is over the music window, that window is presented in a focused state, while the remaining windows are presented in the glanced stated. In the focused state, the size of the music window and the cover are enlarged and an option is presented to play the music album. If a user selection to play the music album is received, the music streaming starts, the menu 120 is dismissed, and the user control switches back to the video game application. If a user selection of the music window is received instead, an option to pin the music window to the display can be presented. Upon performing the pinning, the music window is presented on the display, the menu 120 is dismissed, and the user control switches back to the video game application. If the user scroll continues, the music window is presented again in the glanced state. Similar interactivity with the video game application can occur. Here, if the user accepts the invitation to the game tournament, the video game application is updated to change the game play to the video game tournament and the video game content 110 would show that the video game player is joining the tournament.

Although FIG. 1 describes a window as being presented in a dynamic menu area or can be launched from an icon in a static menu area, other presentations of the window are possible. For instance, user input from the input device (e.g., a particular key push) can be associated with the window. Upon receiving the user input, the window can be presented in a layer over the video game content 110, without the need to present the menu 120.

Figure 2:
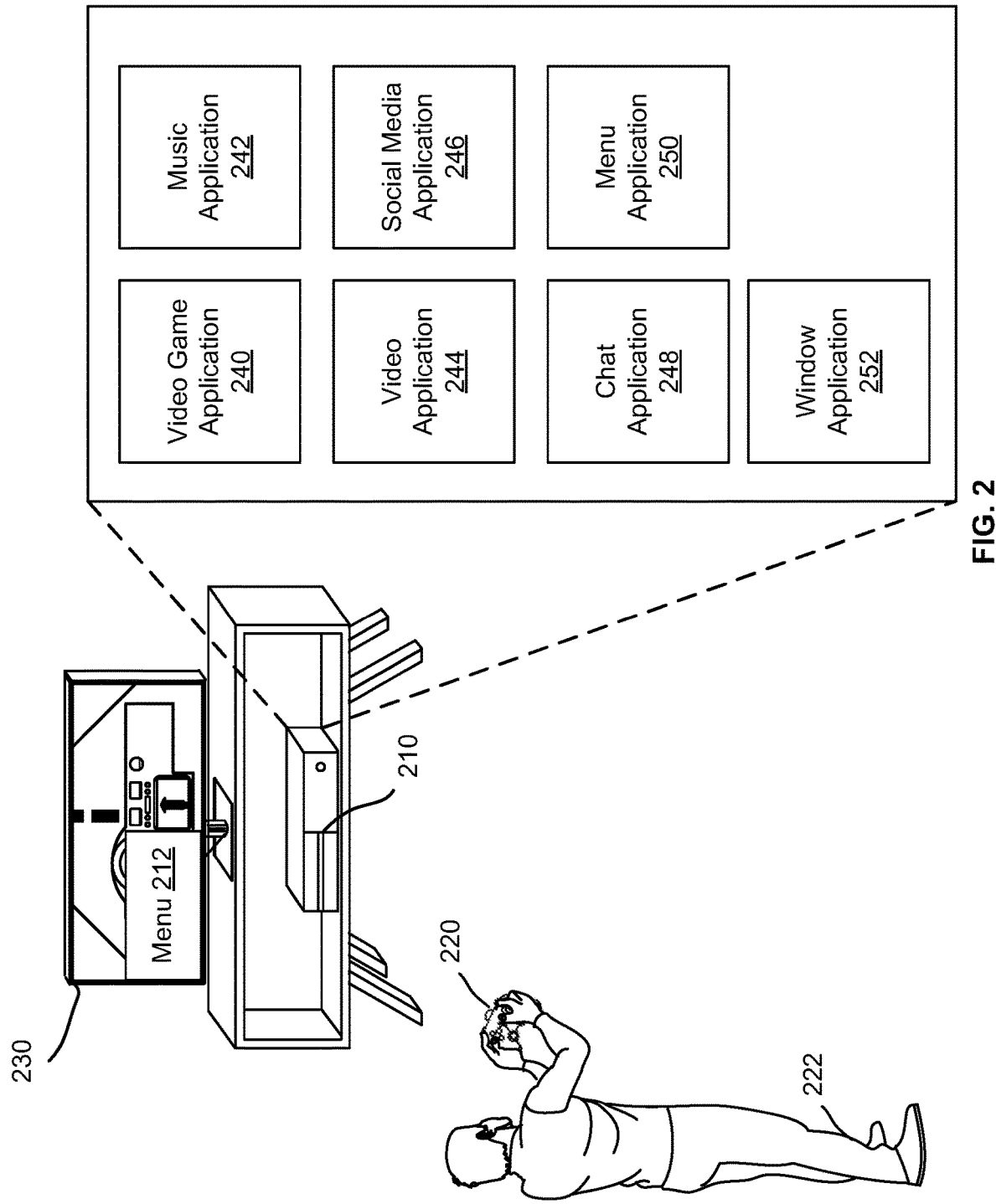
FIG. 2 illustrates a computer system that presents a menu, according to an embodiment of the present disclosure.

FIG. 2 illustrates a computer system that presents a menu, according to an embodiment of the present disclosure. As illustrated, the computer system includes a video game console 210, a video game controller 220, and a display 230. Although not shown, the computer system may also include a backend system, such as a set of cloud servers, that is communicatively coupled with the video game console 210. The video game console 210 is communicatively coupled with the video game controller 220 (e.g., over a wireless network) and with the display 230 (e.g., over a communications bus). A video game player 222 operates the video game controller 220 to interact with the video game console 210. These interactions may include playing a video game presented on the display 230, interacting with a menu 212 presented on the display 230, and interacting with other applications of the video game console 210.

The video game console 210 includes a processor and a memory (e.g., a non-transitory computer-readable storage medium) storing computer-readable instructions that can be executed by the processor and that, upon execution by the processor, cause the video game console 210 to perform operations relates to various applications. In particular, the computer-readable instructions can correspond to the various applications of the video game console 210 including a video game application 240, a music application 242, a video application 244, a social media application 246, a chat application 248, a menu application 250, among other applications of the video game console 210 (e.g., a home user interface (UI) application that presents a home page on the display 230).

The video game controller 220 is an example of an input device. Other types of the input device are possible including, a keyboard, a touchscreen, a touchpad, a mouse, an optical system, or other user devices suitable for receiving input of a user.

In an example, the menu 212 is similar to the menu 130 of FIG. 1. Upon an execution of the video game application 240, a rendering process of the video game console 210 presents video game content (e.g., illustrated as a car race video game content) on the display 230. Upon user input from the video game controller 220 (e.g., a user push of a particular key or button), the rendering process also presents the menu 212 based on an execution of the menu application 250. The menu 212 is presented in a layer over the video game content and includes a dynamic area and a static area. Windows in the dynamic area correspond to a subset of the applications of the video game console.

Upon the presentation of the menu 212, the user control changes from the video game application 240 to the menu application 250. Upon a receiving user input from the video game controller 220 requesting interactions with the menu 212, the menu application 250 supports such interactions by updating the menu 212 and launching any relevant application in the background or foreground. The video game player 222 can exit the menu 212 or automatically dismiss the menu 212 upon the launching of an application in the background or foreground. Upon the exiting of the menu 212 or the dismissal based on a background application launch, the user control changes from the menu application 250 to the video game application 240. If a foreground ground application is launched, the user control changes from the menu application 250 to this application instead. In both cases, further user input that is received from the video game controller 220 is used for controlling the relevant application and/or for requesting the menu 212 again.

The menu application 250 includes a content monitoring service, as described in more detail in reference to FIG. 5, below. The content monitoring service pre-fetches data in response to new application content being available via a content network or other source. The pre-fetched data is then cached by the menu application 250 and used to populate windows in the first presentation state or the second presentation state. For windows in the third presentation state, pre-fetched data is copied form the cache and sent to a window application 252 for generating and/or presenting the window as described in more detail in reference to FIG. 4.

Although FIG. 2 illustrates that the different applications are executed on the video game console 210, the embodiments of the present disclosure are not limited as such. Instead, the applications can be executed on the backend system (e.g., the cloud servers) and/or their execution can be distributed between the video game console 210 and the backend system.

Figure 3:
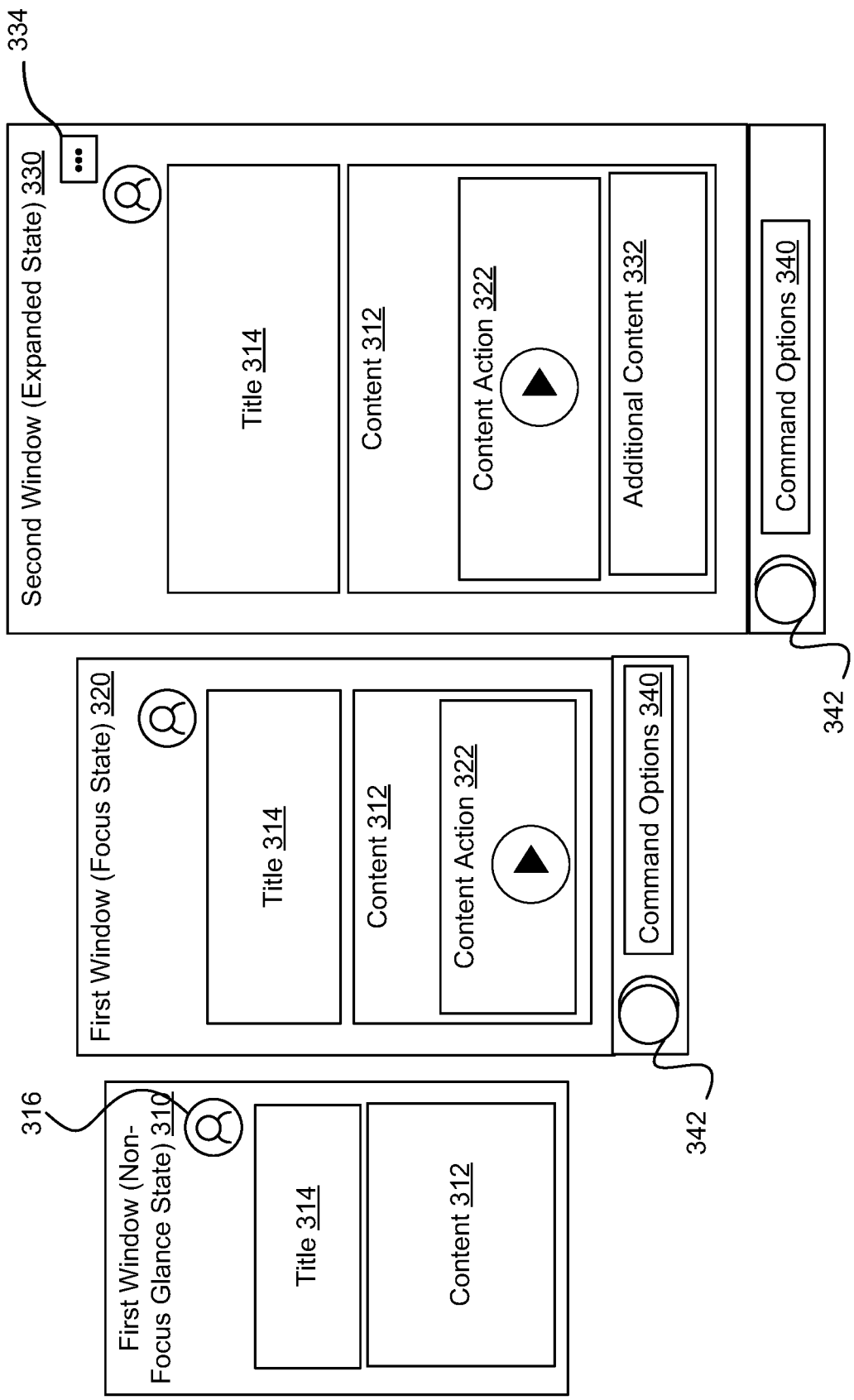
FIG. 3 illustrates an example of a window in different states, according to embodiments of the present disclosure.

FIG. 3 illustrates an example of a window in different states, according to embodiments of the present disclosure. Here and in subsequent figures, an action card is described as an example of a window and corresponds to an application. Generally, a window represents a GUI object that can show content and that can support an action performable on the content and/or window. In an example, the action card is a specific type of the window, where the action card includes a container object for MicroUX services, and where the action card contains content and actions for a singular concept. Action cards included in a menu facilitate immediate and relevant actions based on contexts of what the users are engaged with and the relationships of people, content, and services within a computer environment.

As illustrated in FIG. 3, the action card can be presented in one of multiple states. Which state is presented depends on the user input, as further described in the next figures. One of the states can be a glanced state 310, where the action card provides a glance to the user about the application. The glance includes relevant information about the action card, where this information should help the user in deciding in taking an action or not. For example, in the glanced state 310, the action card has a first size, and presents content 312 and a title 314 of the content 312 or the action card based on the first size. To illustrate, an action card for a music application can be presented in the first state as a rectangle having particular dimensions, showing a cover and a title of a music album.

Another state can be a focused state 320, where the action provides relevant information to the user and one or more options for one or more actions to be performed (e.g., for one or selectable actions on content of the application or the action card itself). In other words, the action card can surface quick actions for the user to select in response to the user's focus being on the action card. For example, in the focused state 320, the action card has a second size (which can be larger than the first size), resizes the presentation of the content 312 and the title 314 based on the second size, and presents one or more selectable content actions 322 (e.g., play content, skip content, etc.) and one or more selectable card actions (e.g., move the action card to a position on the display, resize the action card, pint the action card, present the action card as a picture-in-picture, etc.). Referring back to the music action card illustration, in the focused state 320, the music cover and album title are enlarged and a play button to play music files of the music album is further presented.

Yet another state can be an expanded state 330, where the action continues to provide relevant information to the user in a further enlarged presentation format, and provides one or more options for one or more actions to be performed on the connect and/or the action card itself (e.g., for one or selectable actions on content of the application or the action card itself). In other words, the action card becomes the primary modality for interacting with the MicroUX and displays the relevant visual interface. For example, in the expanded state 330, the action card has a third size (which can be larger than the second size), resizes the presentation of the content 312 and the title 314 based on the third size, continues the presentation of the content action 322, presents additional content 332 of the application, and presents one or more options 334 for one or more content actions and for one or more card actions that can be performed on the action card. Referring back to the music action card illustration, in the expanded state 330, the music cover and album title are further enlarged and the presentation of the play button continues. Additional music files of the music album are also identified. The option 334 provides the choice of pinning the action card to the side of other content that is being presented on the display (e.g., video game content), presenting the action card as a picture in picture within the other content, or to run the music application (e.g., play the music album) in the background. In the above states, the content 312, title 314, content action 322, and additional content 332 can be identified from metadata received from the application.

As illustrated in FIG. 3, the action card can include a static presentation and a dynamic presentation area, each of which can be resized depending on the state. For instance, the title 314 is presented in the static area, identifies the underlying application associated with the action card and does not change with the state. In comparison, the content 312 can be presented in the dynamic area and can change within each state and between the states. In particular, the content itself may be interactive (e.g., a video) and its presentation can by its interactive nature change over time. Additionally or alternatively, the content 312 can also be changed over time depending on the user context and/or the application context.

As illustrated in FIG. 3, the first window 310, the first window 320, and the second window 330 each include an icon 316. The icon may be an image representative of one or more things including, but not limited to, the user (e.g., a profile picture), the computer system (e.g., a system logo or image), a target application (e.g., a badge or icon from the application), and a system icon representing the type of target application (e.g., a general symbol for the type of content being presented, for example, a music note for an audio player, a camera for an image gallery, a microphone for a chat application, etc.).

As illustrated in FIG. 3, the action card in the glanced state 310, the action card in the focused state 320, and the action card in the selected state 330 each include an icon 316. The icon 316 may be an image representative of one or more things including, but not limited to, the user (e.g., a profile picture), the computer system (e.g., a system logo or image), a target application (e.g., a badge or icon from the application) corresponding to the action card, and a system icon representing the type of target application (e.g., a general symbol for the type of content being presented, for example, a music note for an audio player, a camera for an image gallery, a microphone for a chat application, etc.).

As illustrated in FIG. 3, in an action card in the focused state (e.g., focused state 320) one or more command options 340 are included. While FIG. 3 shows the command options 340 in a panel positioned lower than the content, the command options 340 could be positioned as an overlay in front of the content, in a side panel, and/or positioned above the content near the title 314. The command options 340 may include textual or image-based instructions or may include one or more interactive elements 342 such as buttons or other virtual interactive elements. For example, the interactive elements 342 may include a button configured to receive a user-click. In some embodiments, the command options 340 and the interactive elements 342 facilitate interaction with content 312 and/or additional content 332. For example, the command options may provide additional and/or alternative function control over content beyond what is provided by content action 322. To illustrate, the content action 322 may provide a play/pause function for an audio or video player, while one of the command options 340 may include a mute/unmute function for a party chat application. The command options 440 may be context-specific, for example, being based on the current state of the content in the action card. For example, when an action card is playing audiovisual content, the command options 440 may include only a mute button, rather than a mute/unmute button, and a stop button, rather than a play button.

As illustrated in FIG. 3, the different presentation states of the action card include different numbers of elements (e.g., types of content, command options, sub-windows, etc.). The elements may be arranged according to one or more patterns, each defining a display arrangement of elements in the action card. In some embodiments, the pattern is part of what is defined by a data template, as described in more detail in reference to FIG. 4.

It should be understood that any suitable type of elements, arrangement, and/or cadence for display of elements within an action card can be defined by a data template. The data template can be specific to a single presentation state or can be applicable to multiple presentation states. Also, there may be any suitable number of data templates. For example, the data template for a first action card can be different from the data template used to present a different action card in the same presentation state as the first action card.

It should also be understood that, although different action cards may use the same data template, the underlying sources of contents that are presented according to the data template may be different for each action card. The sources of data content (e.g., in a local storage on the computer system and/or uniform resource identifiers (URIs)) for each action card may be specified in any suitable fashion. For example, a content monitoring service may receive as input a source manifest (or script, code, etc.) in addition to a data template. The source manifest may indicate particular locations to retrieve data contents from, and the data template may indicate how to arrange the contents (e.g., dimensions, color, contrast, etc.) within an action card for presentation.

In some embodiments, a data template may be predefined so as to constrain the number and/or types of elements that may be presented within an action card for one or more of the presentation states. For example, the data template may prohibit auto-playing of video links (e.g., in a tile) in a glanced state, which may typically take a longer amount of time to load and render than other elements (e.g., text). In another example, the data template may assign each element a cost. The number of elements allowed for loading and presentation may be constrained to be under the total allowable cost. In this way, and as described further herein, the system may improve the performance for presenting the action card in a particular presentation statw. For example, when the action card is presented first in a glanced state, the system may initially only load and present contents corresponding to this presentation state, rather than additional content that may be presented in the focused state or selected state. In some embodiments, by utilizing predefined data templates for presentation states, the action cards can be presented in less than or equal to a predefined amount of time that corresponds to a performance goal (e.g., 200 milliseconds (ms), 500 ms, etc.).

As illustrated in FIG. 3, the first presentation state is populated by the fewest elements, and the second presentation state is populated by fewer elements than the third presentation state, which is populated by the largest number of elements. Providing multiple patterns defining the action card in multiple presentation states improves both user experience and system performance. Limiting the number of action cards in the focused state 320, for example, prevents user fatigue and ensures that the expanded state 330 is only generated and/or presented for a single action card. As described in more detail in reference to the figures, below, presenting the expanded state 330 includes processes that demand system resources and an additional window application. To that end, preventing direct cycling between action cards in the expanded state 330 improves system efficiency.

In reference to the figures, below, the term action card is used to describe a window in one or more of the presentation states. For example, a window presenting content in the dynamic menu that is associated with a target application on the computer system that is different from the menu application is referred to as an "action card."

Figure 4:
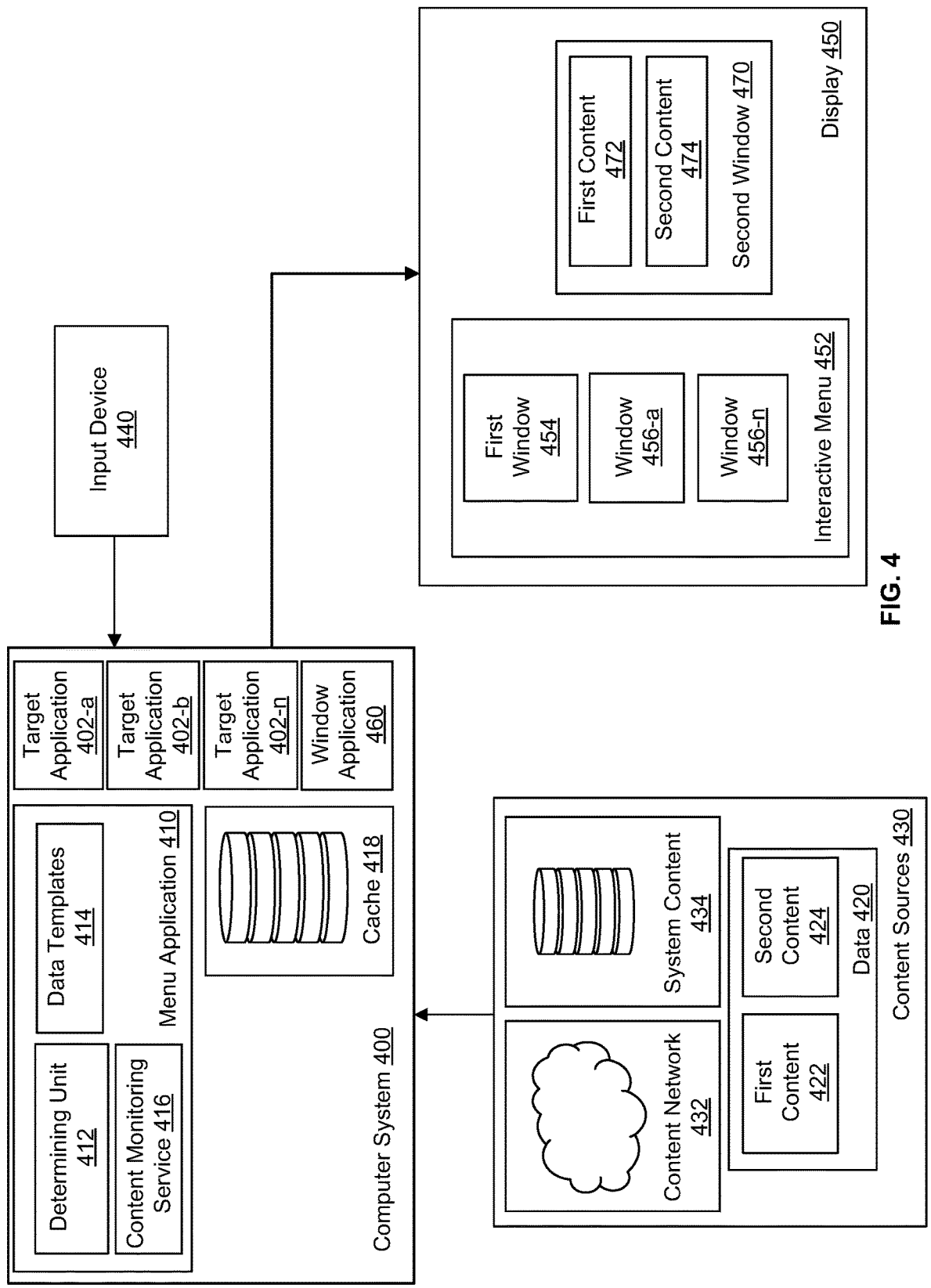
FIG. 4 illustrates an example of a computer system for presentation of content in a menu, according to an embodiment of the present disclosure.

FIG. 4 illustrates an example of a computer system 400 for presentation of content in an interactive menu and an action card, according to an embodiment of the present disclosure. As described in more detail in reference to FIGS. 1-2, the computer system 400 may be a videogame system, a backend system, or any other system configured to store and present content on a display. As illustrated, the computer system 400 includes multiple target applications 402a-n (hereinafter also referred to as target application 402, target applications 402, target app 402, or target apps 402, for simplicity), where "a," "b," and "n" are positive integers and "n" refers to the total number of target applications. As illustrated, the computer system 400 further includes a menu application 410, a cache 418, and a window application 460. Each of the target applications 402 may correspond to a different application running on the computer system or on a backend system, as described in more detail in reference to FIGS. 1-2. The target application 402 may be a system application or a user application, and is different from the menu application 410. Generally, the difference between a system application and a user application depends on how a provider of the computer system 400 delineates the system application layer and the user application layer of the computer system 400. The system application is an application of the system application layer, such as an application native to an operating system of the computer system 400. In comparison, the user application is an application of the user application layer, such as an application that can be downloaded from an application store that may or may not be managed by the provider of the computer system 400.

The cache 418 may include a local memory on the computer system (e.g., a hard disk, flash drive, RAM, etc.) configured for rapid storage and retrieval of data to minimize latency. As illustrated, the menu application 410 includes a determining unit 412, one or more data templates 414, and a content monitoring service 416. The determining unit 412 may be implemented as software and/or hardware, such that the menu application 410 may determine a data template 414 that is defined for a specific target application 402. The data templates 414, identify the types of content for the computer system 400 to store in the cache 418 for the target application 402 based on the association of a data template 414 with a target application 402. In some cases, each data template 414 further associates a type of content (e.g., audio, video, video game content, etc.) with one or more presentation states.

The menu application may store data 420 in the cache 418, where the data 420 may include multiple types of content including, but not limited to, first content 422 and second content 424. For example, as described in more detail in reference to FIGS. 1-2, the content may include video content, audio content, video game content, party chat information, etc. The data 420 may also include a first uniform resource identifier (URI) of the first content 422, where a URI typically is characterized by a string of characters identifying a resource following a predefined set of syntactical rules. For example, a URI may identify a resource to facilitate interaction involving that resource between networked systems. Similarly, the data 420 may include URI information for each type content, for example, a second URI of the second content 424. The first content 422 and the second content 424 may be identified in one or more data templates 414 and associated in the data templates 424 with a first presentation state, a second presentation state, and/or a third presentation state, as described in more detail in reference to FIGS. 1-2. For example, the first content 422 may be associated with a first presentation state and with a second presentation state, and the second content 424 may be associated only with the second presentation state, as defined in a given data template 414. In this way, the cache 418 may store multiple types of content associated with multiple data templates 414, making up data for different target applications 402.

As illustrated, the computer system 400 is communicatively coupled with one or more content sources 430 from which the computer system may pre-fetch and/or receive data 420. For example, the content sources 430 may include a content network 432, including, but not limited to, a cloud-based content storage and/or distribution system. The content sources 430 may also include system content 434 provided by a data store communicatively coupled with the computer system (e.g., a hard drive, flash drive, local memory, external drive, optical drive, etc.).

As illustrated, the computer system 400 is communicatively coupled to an input device 440, which may include, but is not limited to a user input device as described in more detail in reference to FIG. 2 (e.g. video game controller 220 of FIG. 2). The input device 440 may provide user input to the computer system 400 to facilitate user interaction with the data 420 stored in the cache 418. As described in more detail below, the interaction may take place via one or more menus and/or action cards in a UI. For example, the computer system 400 may generate user interface data to configure a user interface including a static menu and a dynamic menu, as described in more detail in reference to FIG. 1 (e.g., static menu area 140 and dynamic menu area 130 of menu 120 of FIG. 1).

As illustrated, the computer system 400 is communicatively coupled with a display 450. The display 450 may include any general form of display compatible with interactive user interfaces (e.g., display 230 of FIG. 2). The display 450 may include an augmented reality and/or virtual reality interface produced by a wearable and/or portable display system, including but not limited to a headset, mobile device, smartphone, etc. In response to input provided by the input device 440, received as user input by the computer system 400, the computer system 400 may present an interactive menu 452 via the display 450 (e.g., dynamic menu area 130 of FIG. 1). As described in more detail in reference to FIGS. 1-2, the interactive menu 452 may include a static menu and a dynamic menu, where the dynamic menu includes one or more action cards 456-a-n, where "a" and "n" are positive integers and "n" refers to the total number of action cards (hereinafter referenced as action cards 456, for simplicity). As illustrated, the action cards 456 may be presented in the first presentation state (e.g., glanced state), and each may correspond to different target applications 402, and each be populated with different data 420 according to a different data template 414 associated with the different target applications 402. For example, the action cards 456 may include a first action card 454 that corresponds to a first target application 402, such that the first action card 454 presents first content 422 based on data from the cache 418 and according to a data template 414 defined for the first target application 402. For example, a data template of the data templates 414 for a video game application defines that an action card for the video game application in the glanced state is populated with content presenting the title of the video game application and the most recent level played by the user of the computer system 400. Furthermore, the action card in the glanced state may indicate that an additional option to download new level is available. In the focused state, by contrast, the data template for the video game application provides further content in the form of trophies, and a command option to launch a new level or to interact with the video game application in additional ways (e.g., watching a replay, chatting with other players, etc.). To reduce latency during menu loading, the content monitoring service 416 pre-fetches the content to be used for the three presentation states (e.g., title, level play information, trophy information, available level information, and downloadable content) and stores the pre-fetched data in the cache 418.

As described in more detail in reference to FIGS. 1-2, the computer system 400 may receive one or more types of user interaction via the input device 440 taking the form of a request for the second presentation state (e.g., focused state) associated with the target application of the first action card 454, as described in more detail in reference to FIG. 3. This may include a user button press on the first action card 454 and/or another form of user interaction via the input device 440 that constitutes a command option (e.g., command option 340 of FIG. 3). The computer system 400 may respond to the user input by generating a copy of the data associated with the first target application 402 from the cache and sending the copy of the data associated with the first target application 402 to the window application 460. As illustrated, the window application 460 is different from the menu application and the first target application 402. The window application 460 may be configured to generate user interface data, such that a user interface generated using the user interface data may present, via display 450, a second action card 470 that corresponds to the first target application 402 presented in the second presentation state. The second action card 470, in the second presentation state, may include both first content 472 and second content 474 presented based on the data template 414 associated with the target application 402. The first content 472 and the second content 474 may be populated in the second action card 470 by the window application 460 using the copied data sent to the window application 460 by the menu application 410, in response to user input received by the computer system 400 via the input device 440.

Figure 5:
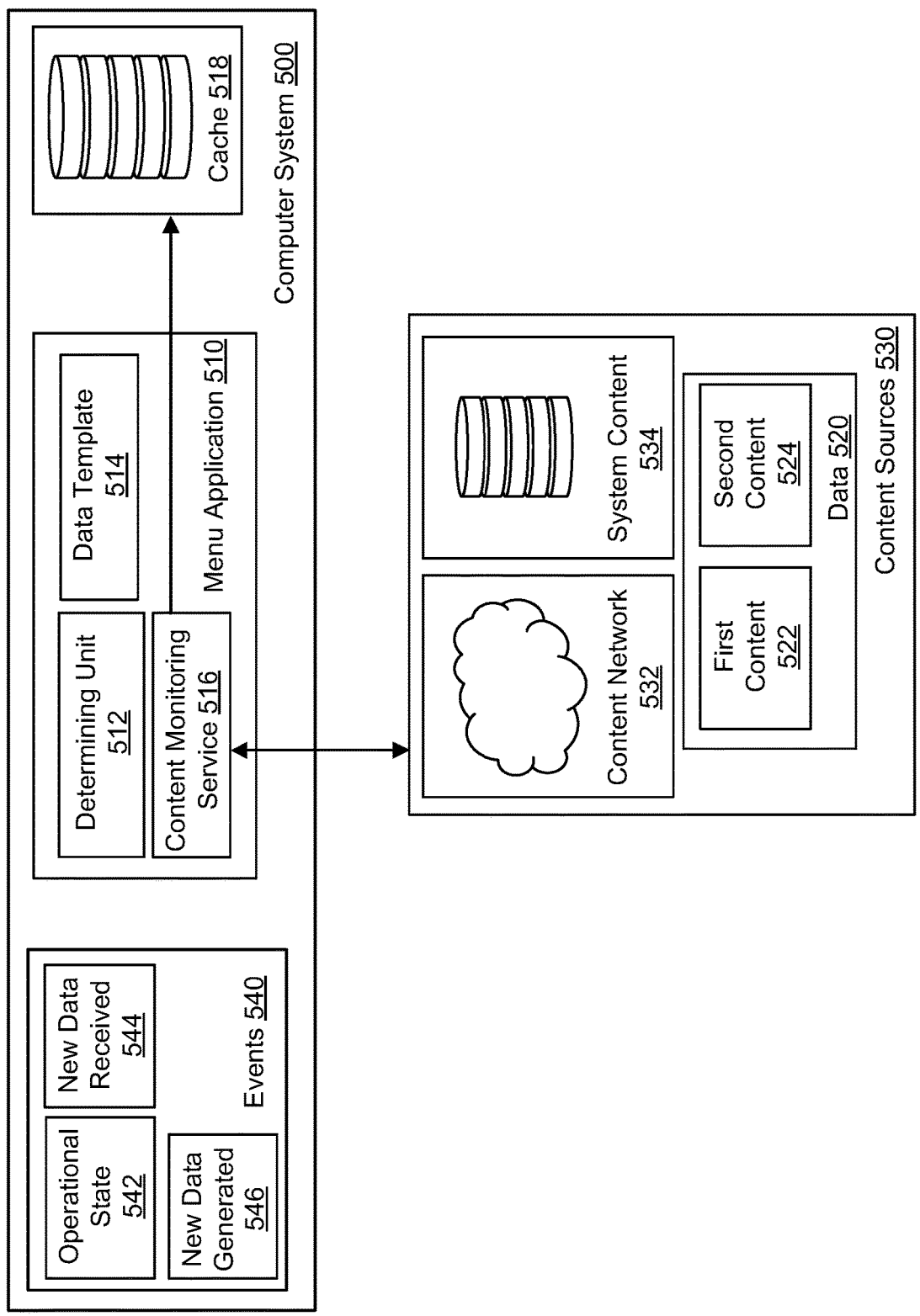
FIG. 5 illustrates another example of another computer system for presentation of content in a menu, according to an embodiment of the present disclosure.

FIG. 5 illustrates another example of another computer system 500 for presentation of content in an interactive menu and an action card, according to an embodiment of the present disclosure. As illustrated in FIG. 5, the computer system 500 may actively pre-fetch data 520 from one or more content sources 530 without receiving user interactions (e.g., via input device 440 of FIG. 4). The computer system 500 may include a menu application 510, a cache 518, and data associated with one or more events 540. As illustrated, the computing system 500 is communicatively coupled with the content sources 530, whereby a content monitoring service 516 of the menu application 510 the fetches data 520, including the first content 522 and the second content 524. As described in more detail in reference to the content network 432 and the system content 434 of FIG. 4, the content sources 530 may include a content network 532 and/or system content 534.

The content monitoring service 516 may actively monitor active processes of the computer system 500 for changes to the operational state 542 of the computer system 500 or of one or more target applications (e.g., target applications 402 of FIG. 4). For example, the operational state of a party chat application may be associated with a dynamic list of participants in a specific chat group, such that a change in the participants may elicit a corresponding change in the operational state. In another example, a music player application may include a playlist function that populates a queue using a recommendation engine, such that the queue is filled dynamically based on user interactions or past user selections. The system may receive user interaction requesting that the music player application skip forward to the next file in the queue, or that the file should be followed by similar filed according to one or more features of the file (e.g., a "favorite" command). Such interactions may be associated with a corresponding change in the operational state 542 for the target application, eliciting the computing service 516 to pre-fetch the corresponding data 520 from the content sources 530.

As illustrated, the events 540 also include new data received 544 and new data generated 546. The new data received 544 may include data provided to the computer system 500 by a process operating on the computer system 500 created by a system application (e.g., a background gaming network platform) or a user application (e.g., a videogame), such that the computer system 500, via the content monitoring service 516 of the menu application 510 pre-fetches data 520 from the content sources 530. For example, a system application may send new data corresponding to new content being available from the content sources 530 for one or more target applications on the computer system 500. As an illustrative example, this may include the first content 522 for which the content monitoring service 516 is configured to automatically pre-fetch and store any new downloadable content. As another illustrative example, the new data received 544 may include a URI of the second content 524 in a content source 530 in accordance with which the content monitoring service 516 will pre-fetch the second content 524 from the content sources 530 and store the second content 524 in the cache 518. Similarly, the new data generated 546 may elicit a pre-fetch process by the content monitoring service 516, to provide additional content for a target application as described in more detail in reference to FIG. 4. For example, a user input request via an input device (e.g., input device 440 of FIG. 4) to present a first action card (e.g., first action card 454 of FIG. 4) in a second presentation state (e.g., action card 454 of FIG. 4 in the focused state) may elicit the computing service 516 to pre-fetch the second content 524 and store it in the cache 518 for use by the window application (e.g., window application 460 of FIG. 4) in generating and/or presenting the second action card (e.g., second action card 470 of FIG. 4). Similar examples of the new data generated 546 by the computer system 500 constituting the events 540 eliciting a pre-fetch on the part of the content monitoring service 516 include, but are not limited to target application data (e.g., in game events, in game achievements, user requests for user-content via online catalog applications, etc.), data generated by system applications during operation of the computer system 500 (e.g., expiration of a license for a target application, system-level information configured for presentation via one or more action cards in a menu, etc.), and user data (e.g., user-interactions via a menu or UI of the computer system 500, for example, by adding a new target application to the computer system 500).

Figure 6:
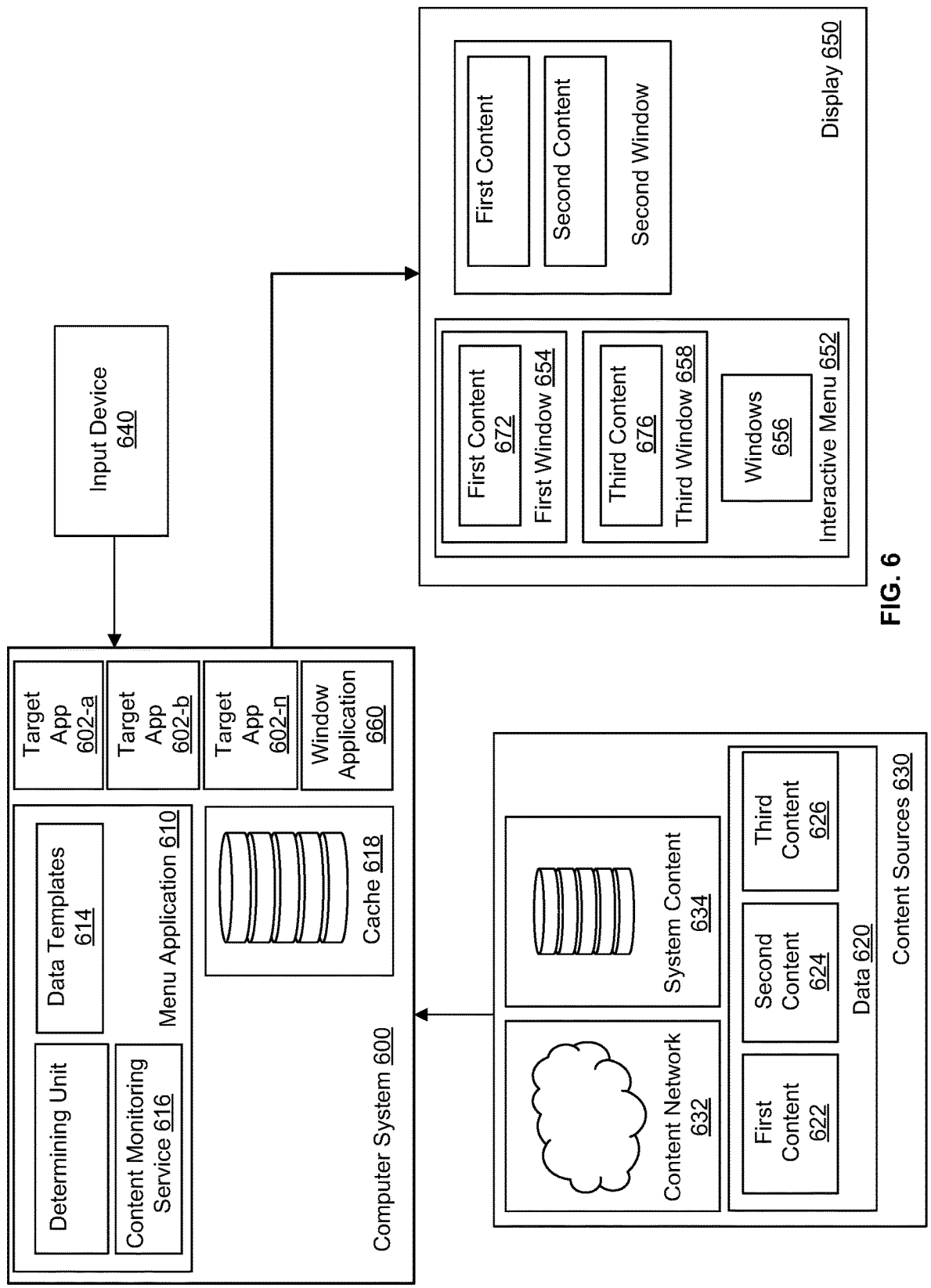
FIG. 6 illustrates an example another example of another computer system for presentation of content in a menu, according to an embodiment of the present disclosure.

FIG. 6 illustrates an example another example of another computer system 600 for presentation of content in an interactive menu and an action card, according to an embodiment of the present disclosure. As illustrated in FIG. 6, and as described in more detail in reference to FIG. 4, a first action card 654 may be presented in an interactive menu 652 via a display 650 in response to user interaction via an input device 640. The first action card 654 may be populated by first content 672 according to a data template 614 associated with a target app 602, where the first content is received and/or fetched by computing service 616 of computer system 600 from data 620 of content sources 630. As described in more detail in reference to FIG. 4, content sources may include a content network 632, whereby the third content 626 is stored remotely, and system content 634 whereby the third content 626 is stored locally to the computer system 600.

In some embodiments, along with presentation of the first action card 654, the computer system 600 may determine additional content, for example, based on a third URI of third content 626 included in data 620 from content sources 630. The additional content may be associated with different target app 602 from that of first content 622 in data 620 from content sources 630. As described in more detail in reference to FIG. 5, the computer system may fetch the additional content and store it in cache 618 for presentation in an action card 658 of the interactive menu 652 in the first presentation state, according to a data template 614 associated with the different target app 602. For example, the menu application 610 of computer system 600 may fetch third content 626 from content sources 630, store third content 626 in cache 618. In response to user interaction via input device 640, the menu application may populate third action card 658 with third content 676 according to a data template 614 in the first presentation state. Similarly, additional content may be retrieved, received, and or fetched by computer system 600 from content sources 630 to populate additional action cards 656.

Figure 7:
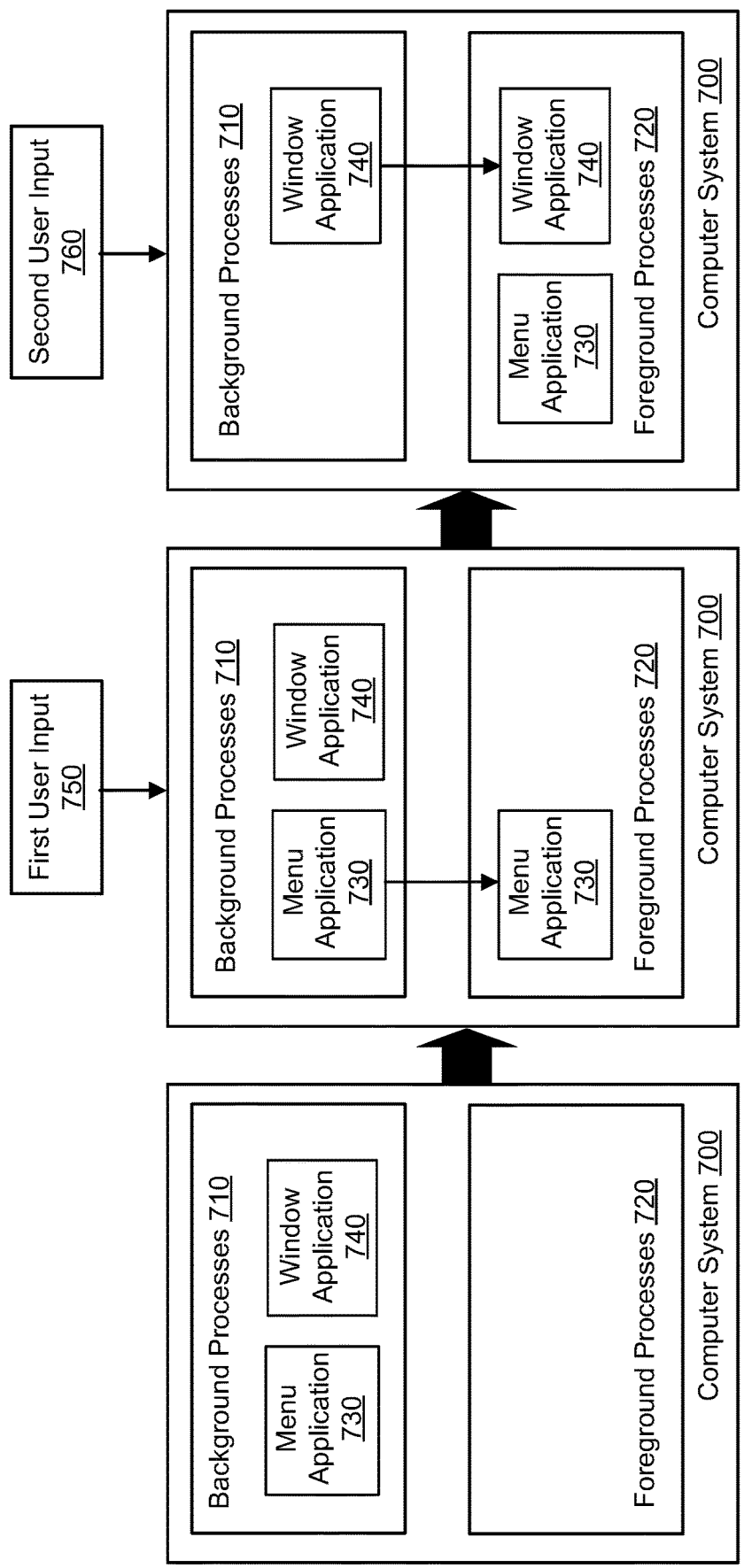
FIG. 7 illustrates an example of a computer system having foreground processes and background processes, according to an embodiment of the present disclosure.

FIG. 7 illustrates an example of a computer system 700 having foreground processes and background processes, according to an embodiment of the present disclosure. As described in more detail in reference to FIGS. 1-3, a computer system 700 (e.g. a console, game system, user device) may operate multiple processes as either background processes 710 or foreground processes 720. The terms "background" and "foreground" may refer to whether a particular process controls the operation of the computer system 700 with regard to peripherals, the display, among other aspects, including whether a process is actively sending and/or receiving data, using system resources (e.g., CPU or GPU resources), and the like. For example, a background process 710 may include a system application or user application that does not determine the processing order of the computer system 700. For example, a foreground process 720 may be designated to receive user input, whether or not a GUI is presented for that process.

As illustrated in FIG. 7, computer system 700 launches menu application 730 and window application 740 as background processes 710, prior to receiving user input, such as first user input 750. An example of first user input 750 may include a user request to generate and/or present the interactive menu via the display, as described in more detail in reference to FIGS. 1-2 (e.g., dynamic menu area 130 of FIG. 1). Upon receiving first user input 570, computer system 700 runs menu application 730 in a corresponding foreground process, actively generating data for presenting action cards in the glanced state of focused state via a display, as described in more detail in reference to FIGS. 4-6. Similarly, as described in more detail in reference to FIG. 4, a second user interaction may include a request to expand an action card (e.g., first action card 454 of FIG. 4) in the interactive menu (e.g., interactive menu 452 of FIG. 4) from the focused state to the expanded state, facilitated by a window application 740 that is different from menu application 730. As illustrated in FIG. 7, computer system 700 may run window application 740 in a corresponding foreground process, in response to receiving a user interaction prompting the window application 740 to generate and/or present an action card in the expanded state. In each of the glanced, focused, and expanded states, the content and actions that are presented and arrangement thereof depends on a data template (e.g., data templates 414 of FIG. 4) that is defined for the target application corresponding to the action card. Furthermore, as described in more detail in reference to FIG. 5, the content and actions are previously pre-cached by the content monitoring service of the menu application.

Figure 8:
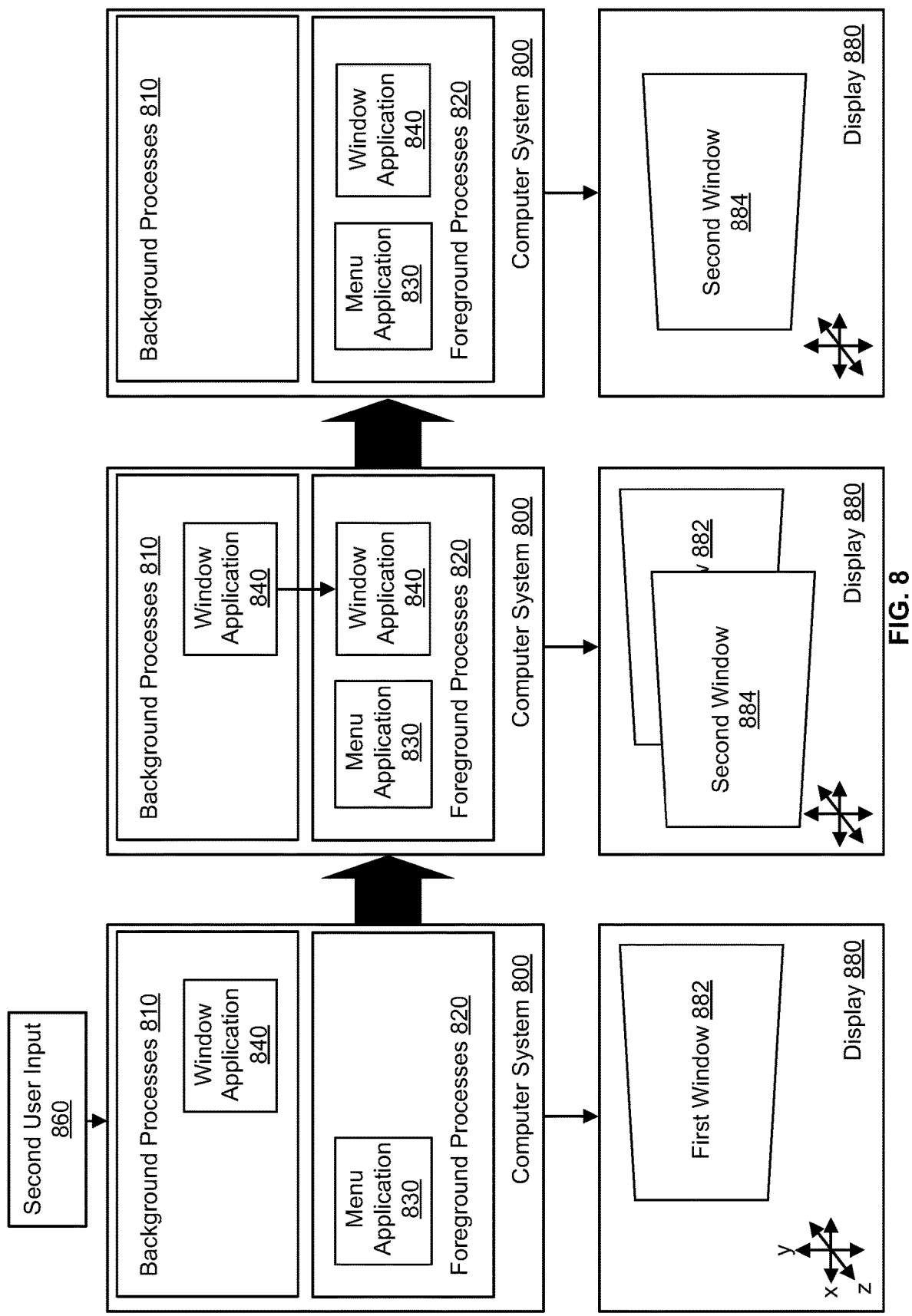
FIG. 8 illustrates another example of another computer system having foreground processes and background processes and presenting windows on a display, according to an embodiment of the present disclosure.

FIG. 8 illustrates another example of another computer system 800 having foreground processes and background processes and presenting action cards on a display, according to an embodiment of the present disclosure. As illustrated, the computer system 800 may present a first action card 882 via display 880 based on a menu application 830 performing operations as a foreground process 820. The first action card 882 is a two-dimensional multilayer window in x-y axis directions, positioned in an ordered layer presentation according to a layer position, denoted by the indicator "z." In response to a second user input 860, for example, a user request to present the first action card 882 in the expanded state, the computer system 800 may run a window application 840 as a foreground process 820, by which the computer system 800 may present a second action card 884 in the display 880. As illustrated, the second action card 884 is presented as an overlay on the first action card 882 (e.g., at a layer position z indicating a superior presentation order than that of the first action card 882), following which the first action card 882 is terminated by the menu application 830 which remains as one of the foreground processes 820. Overlaying the second action card 884 on the first action card 882 prior to terminating the first action card 882 serves the purpose of reducing perceived latency in computer system processes (e.g., retrieving data from cache or generating and/or presenting the second action card 880).

Figure 9:
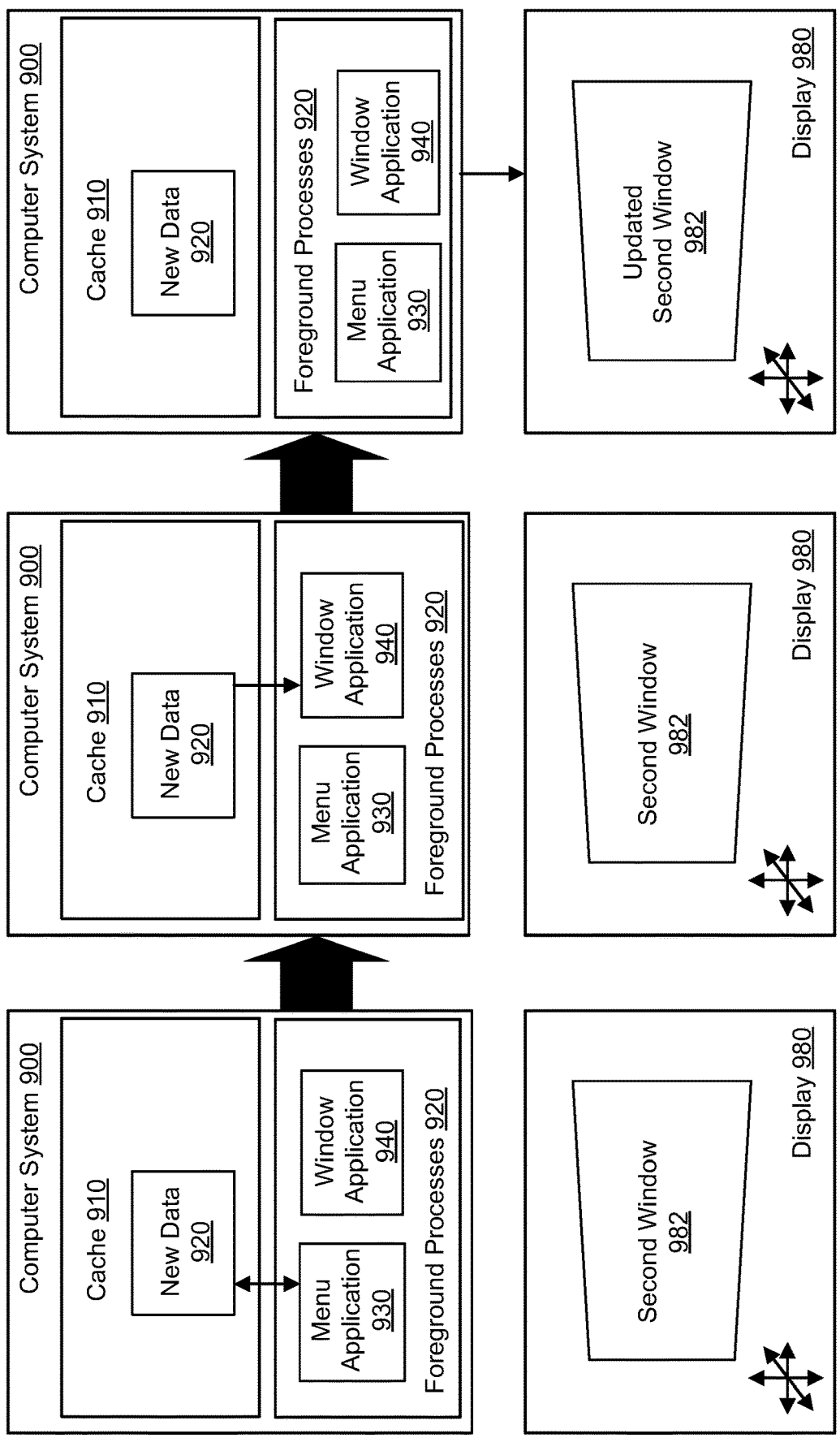
FIG. 9 illustrates an example illustrates another example of another computer system for presentation of content in an updated window on a display, according to an embodiment of the present disclosure.

FIG. 9 illustrates another example of another computer system 900 for presentation of content in an updated action card on a display, according to an embodiment of the present disclosure. When new data 920 is stored in cache 910 by a menu application 930 (e.g., by a content monitoring service,) while a second action card 982 is presented, the computer system 900 may update the second action card 982 dynamically. To achieve such a result, when new data 920 is associated with a target application by a data template for which the second action card 982 is presented on the display 980, the menu application 930 sends a copy of the new data 920 from the cache 910 to the window application 940 running as a foreground process 920. The computer system 900 may determine that new data is available to update the second action card 982 based on a determining unit (e.g., determining unit 412 of FIG. 4). The window application 940 updates the second action card 982 to present the new data 920 as an updated second action card 982. For example, the new data may include any change to data in the cache 910 including, but not limited to, new content from data sources (e.g., data sources 430 of FIG. 4).

Figure 10:
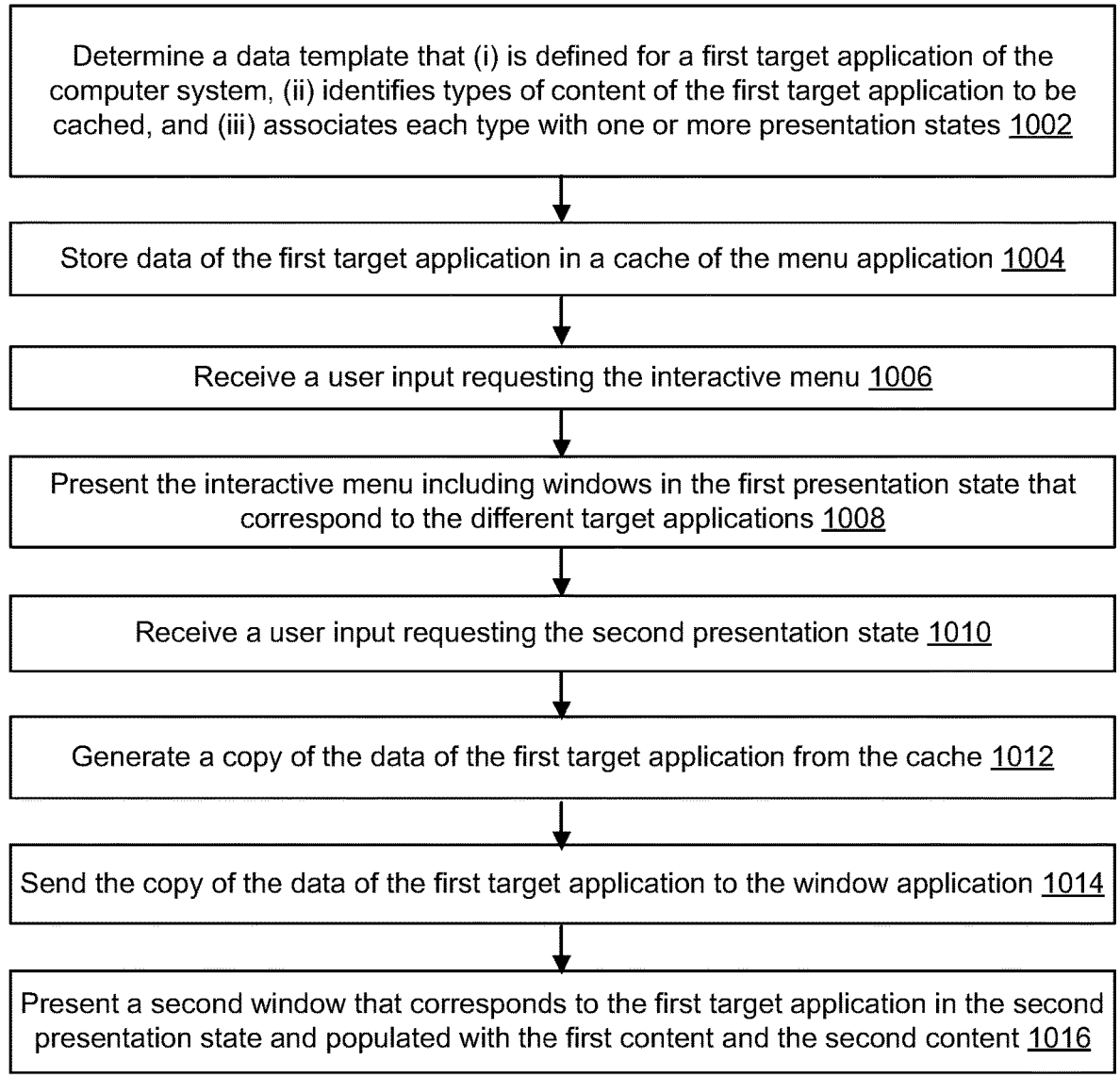
FIG. 10 illustrates an example flow for presenting content in an interactive menu, according to embodiments of the present disclosure.

FIG. 10 illustrates an example flow for presenting content in an interactive menu, according to embodiments of the present disclosure. The operations of the flow can be implemented as hardware circuitry and/or stored as computer-readable instructions on a non-transitory computer-readable medium of a computer system, such as a video game system. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow includes an operation 1002, where the computer system determines a data template that (i) is defined for a first target application of the computer system, (ii) identifies types of content of the first target application to be cached, and (iii) associates each type with one or more presentation states. As described in more detail in reference to FIGS. 3-9, the computer system may determine the data template based on processes of a menu application (e.g., menu application 410 and determining unit 412 of FIG. 4) in accordance with one or more target applications (e.g., target applications 402) running on the computer system.

In an example, the flow includes operation 1004, where the computer system stores data of the first target application in a cache of the menu application. For instance, this may include receiving and/or fetching data using a computing service (e.g., content monitoring service 416 of FIG. 4) of the menu application, in response to event data (e.g., events 540 of FIG. 5).

In an example, the flow includes operation 1006, where the computer system receives a user input requesting the interactive menu. For instance, the user input is received from an input device (e.g., a video game controller) and corresponds to a user push of a key or button on the input device (e.g., a particular video game controller button) or any other type of input (e.g., a mouse click). An event may be generated from the user input indicating a command. The command can be for the presentation of the menu. Otherwise, the command can be for other controls (e.g., the display of a home user interface, an exit from the video game application, etc.) depending on the type of the user input.

In an example, the flow includes operation 1008, where the computer system presents the interactive menu including action cards in the first presentation state that correspond to the different target applications. As described in more detail in reference to FIG. 4, the menu application generates and/or presents an interactive menu (e.g., interactive menu 452 of FIG. 4) includes one or more action cards (e.g., action card 456 of FIG. 4) via the display (e.g., display 450 of FIG. 4) based on data from content sources according to data templates, where each of the one or more action cards corresponds to a different target application and is presented in the first presentation state.

In an example, the flow includes operation 1010, where the computer system receives a user input requesting the second presentation state. As described in more detail in reference to FIG. 4, and above, user input may include an interaction with computer system from an input device (e.g., input device 440 of FIG. 6) via the interactive menu, for example, by a user interaction with an action card (e.g., action cards 456, first action card 454 of FIG. 4).

In an example, the flow includes operation 1012, where the computer system generates a copy of the data of the first target application from the cache. As described in more detail in reference to FIG. 4, the second action card (e.g., second action card 470 of FIG. 4) is populated with multiple content types (e.g., first content 472, second content 474 of FIG. 4) based on data copied from cache (e.g., cache 418 of FIG. 4) and populated in the second action card according to a data template associated with a target application.

In an example, the flow includes operation 1014, where the computer system sends the copy of the data of the first target application to the window application. As described in more detail in reference to FIG. 4, the second action card is generated and/or presented by a window application, using a copy of data from cache.

In an example, the flow includes operation 1016, where the computer system presents a second action card that corresponds to the first target application in the second presentation state and populated with the first content and the second content. As described in more detail in reference to FIG. 3, the second action card is presented in a second presentation state (e.g., a focused state 320 of FIG. 3) including multiple content types and a command option (command option 340, button 342 of FIG. 3). The content presented in the second action card may also include controls (e.g., play/pause button, mute/unmute control, initiate chat, etc.)

Figure 11:
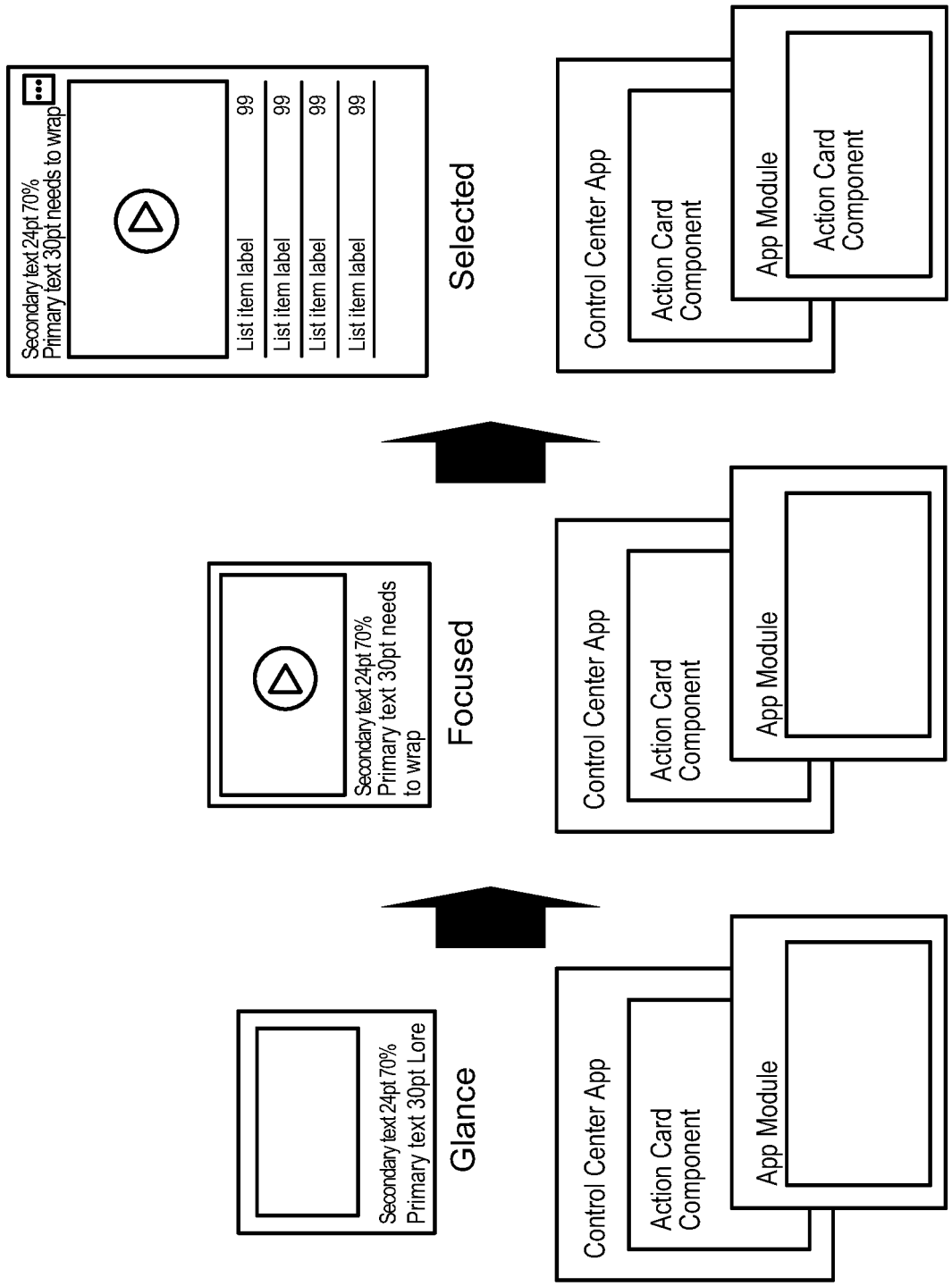
FIG. 11 illustrates an example of launching an application module and terminating a menu application, according to embodiments of the present disclosure.

FIG. 11 illustrates an example of launching an application module and terminating a menu application, according to embodiments of the present disclosure. As described in connection with FIGS. 7-9, the menu application presents a window (e.g., action card) in glanced state and a focused state, whereas a window application presents the window in a selected state. Here, FIG. 11 further describes how the menu application instantiates the window application so that the presentation of the window can switch between the two applications when the presentation state changes from focused to selected.

In particular, the menu application is used to present a menu that includes a plurality of windows. As illustrated, a menu application 1110 supports the presentation of a window 1120 in a glanced state 1122, a focused state 1124, and an expanded state 1126 depending on user input from an input device as explained herein above. The window 1120 corresponds to an application (referred to herein as a "target application" in the interest of clarity). Data about the target application, including content and/or URI, can be prefetched and cached based on a data template defined for the target application as described herein above.

In an example, when the window 1120 is added (along with other windows corresponding to different underlying applications) to the menu, the menu application 1110 also instantiates an application module 1130. The application module 1130 can be a logical container for coordinated objects related to a task (e.g., to present an interfacing window) with optional programming window. The application module 1130 can have parameters common to the different underlying applications (e.g., common objects), whereby it represents a shell from which any of these applications can be quickly launched. When the window 1110 is in the glanced state 1122 or the focused state 1124, the menu application 1110 does not pass content or application-related information to the application module 1130 (this is illustrated in FIG. 11 with blank area of the application module 1130).

When the window 1120 starts transitioning from the focused state 1124 to the expanded state 1126 in response to a user selection of the window 1120, the size, content, and selectable actions of the window 1120 start changing. The menu application passes information about this change along with parameters specific of the underlying application (that corresponds to the window 1120) to the application module 1130 (e.g., state information, programming logic, etc.). Accordingly, the application module 1130 would have the same action card component 1132 as the action card component 1112 presented in the window 1120 during the transition to and in the expanded state 1126. In addition, the application module 1130 corresponds to an instantiation of the underlying application given the specific parameters of this application.

During the transition and in the expanded state 1426, the application module 1430 supports an overlay window 1440 that has the same size and includes the same content and actions as the window 1420. A rendering process presents the overlay window 1440 over the window 1420, such that both windows completely overlap during the transition and in the expanded state 1426. Hence, from a user perspective, the user would only perceive one window (e.g., the overlay window 1440), while in fact two windows are presented on top of each other.

Upon the end of the transition or upon user input requesting action, the window 1420 may be dismissed (e.g., closed) and the overlay window 1440 may be used instead. From that point, the overlay window 1440 becomes the interface to the underlying application and the menu application 1410 can be terminated (or run in the background).

Figure 12:
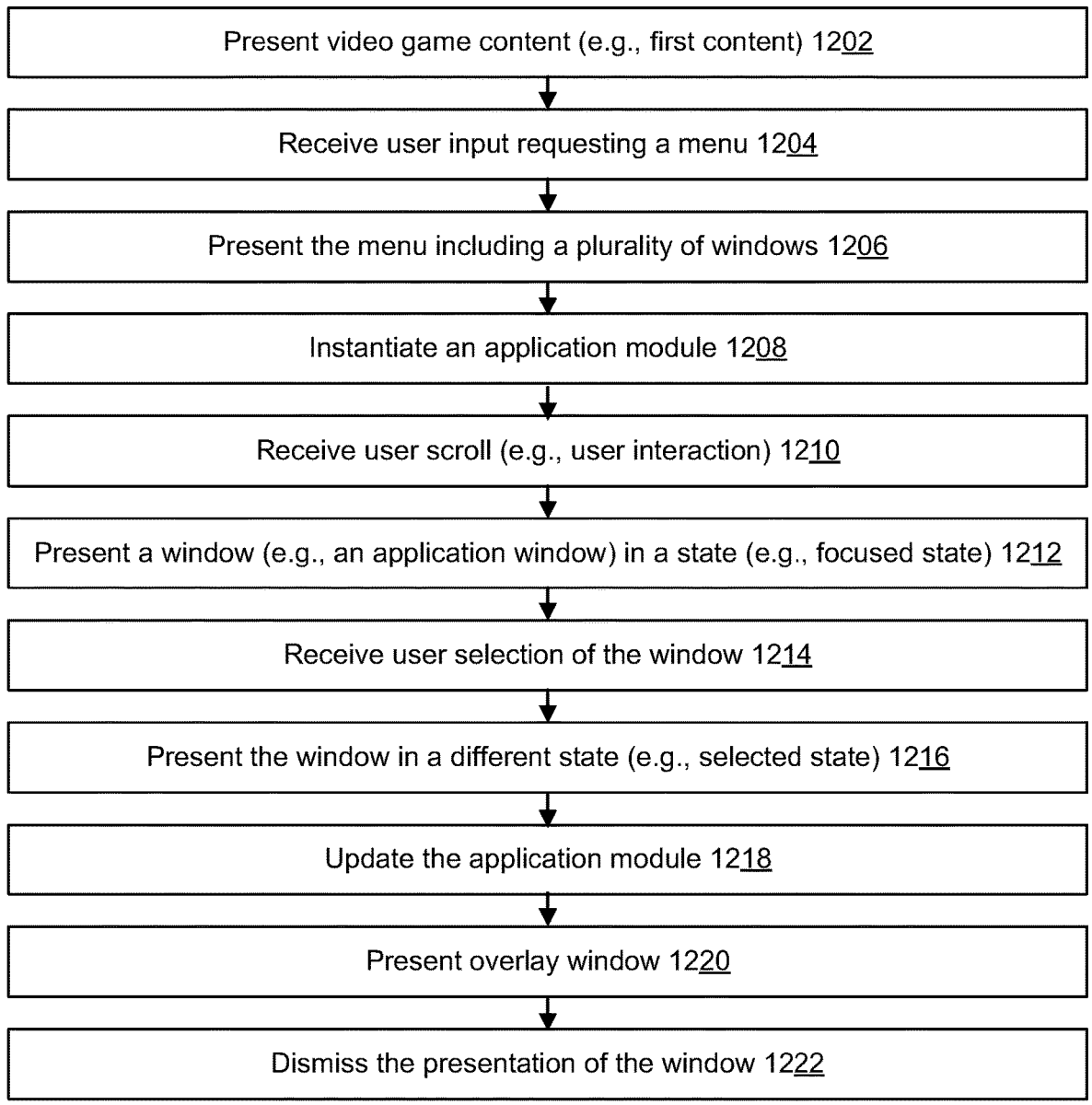
FIG. 12 illustrates an example flow for launching an application module and terminating a menu application, according to embodiments of the present disclosure.

FIG. 12 illustrates an example flow for launching an application module and terminating a menu application, according to embodiments of the present disclosure. The operations of the flow can be implemented as hardware circuitry and/or stored as computer-readable instructions on a non-transitory computer-readable medium of a computer system, such as a video game system. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

In an example, the flow includes an operation 1202, where the computer system presents video content of a video game application (e.g., first content of a first application) on a display. The video game application can be executed on the computer system and the video game content can be presented based on the game play of a user of the computer system (e.g., a video game player).

In an example, the flow includes an operation 1204, where the computer system receives user input requesting a menu. For instance, the user input is received from an input device (e.g., a video game controller) and corresponds to a user push of a key or button on the input device (e.g., a particular video game controller button) or any other type of input (e.g., a mouse click). An event may be generated from the user input indicating a command. The command can be for the presentation of the menu. Otherwise, the command can be for other controls (e.g., the display of a home user interface, an exit from the video game application, etc.) depending on the type of the user input.

In an example, the flow includes an operation 1206, where the computer system presents the menu, where this menu includes a plurality of windows (e.g., action cards) displayed in a dynamic area of the menu and a plurality of icons displayed in a static area of the menu. For instance, the menu is presented in response to the command for the presentation of the menu. In addition, a user context and an application context can be determined and used to select particular application or remote computing services that are likely of interest to the user. Each window within the dynamic menu area corresponds to one of these applications. The windows can also be presented in a glanced state. In one illustration, the window of likely most interest to the user given the user context and application context can be shown in another state (e.g., the focused state). In another illustration, if one of the windows was selected or was in a focused state upon the most previous dismissal of the menu, that window can be presented in the focused state.

In an example, the flow includes an operation 1208, where the computer system instantiates an application module. The application module can have parameters common to the different applications that correspond to the windows of the menu.

In an example, the flow includes an operation 1210, where the computer system receives a user scroll through the windows within the dynamic menu area (or any other types of interactions within the dynamic menu area indicating a focus of the user). The user scroll can be received based on user input from the input device and a relevant event can be generated based on this input.

In an example, the flow includes an operation 1212, where the computer system presents a window (e.g., an application window corresponding to one of the applications where the user focus is currently on) in the other state (e.g. the focused state). For instance, if the user scroll is over the window, that window is presented in the focused state, while the presentation of the remaining windows is in the glanced state.

In an example, the flow includes an operation 1214, where the computer system receives a user selection of the window. The user selection can be received based on user input from the input device and while the window is presented in the focused state. A relevant event can be generated based on this input.

In an example, the flow includes an operation 1216, where the computer system presents the window in a different state (e.g. a expanded state). For instance, the window's size is changed from the focused state to the expanded state, while the presentation of the remaining windows remains in the glanced state.

In an example, the flow includes an operation 1218, where the computer system updates the application module to include parameters specific to the corresponding application of the selected window and to present an overlay window. For instance, the size, content, and actions of the window and the state information and programming logic of the application are passed to the application window, thereby launching an instance of the application from the application module, where this instance can use the information about the size, content, and actions of the window for the presentation of the overlay window.

In an example, the flow includes an operation 1220, where the computer system presents the overlay window. For instance, as the window transitions from the focused state to the expanded state or once in the expanded state, a rendering process also presents the overlay window over the window.

In an example, the flow includes an operation 1222, where the computer system dismisses the presentation of the window. For instance, upon the presentation of the overlay window or upon the transition to the expanded state, the window is closed. In addition, the menu application can be termination or can be moved to the background.

Figure 13:
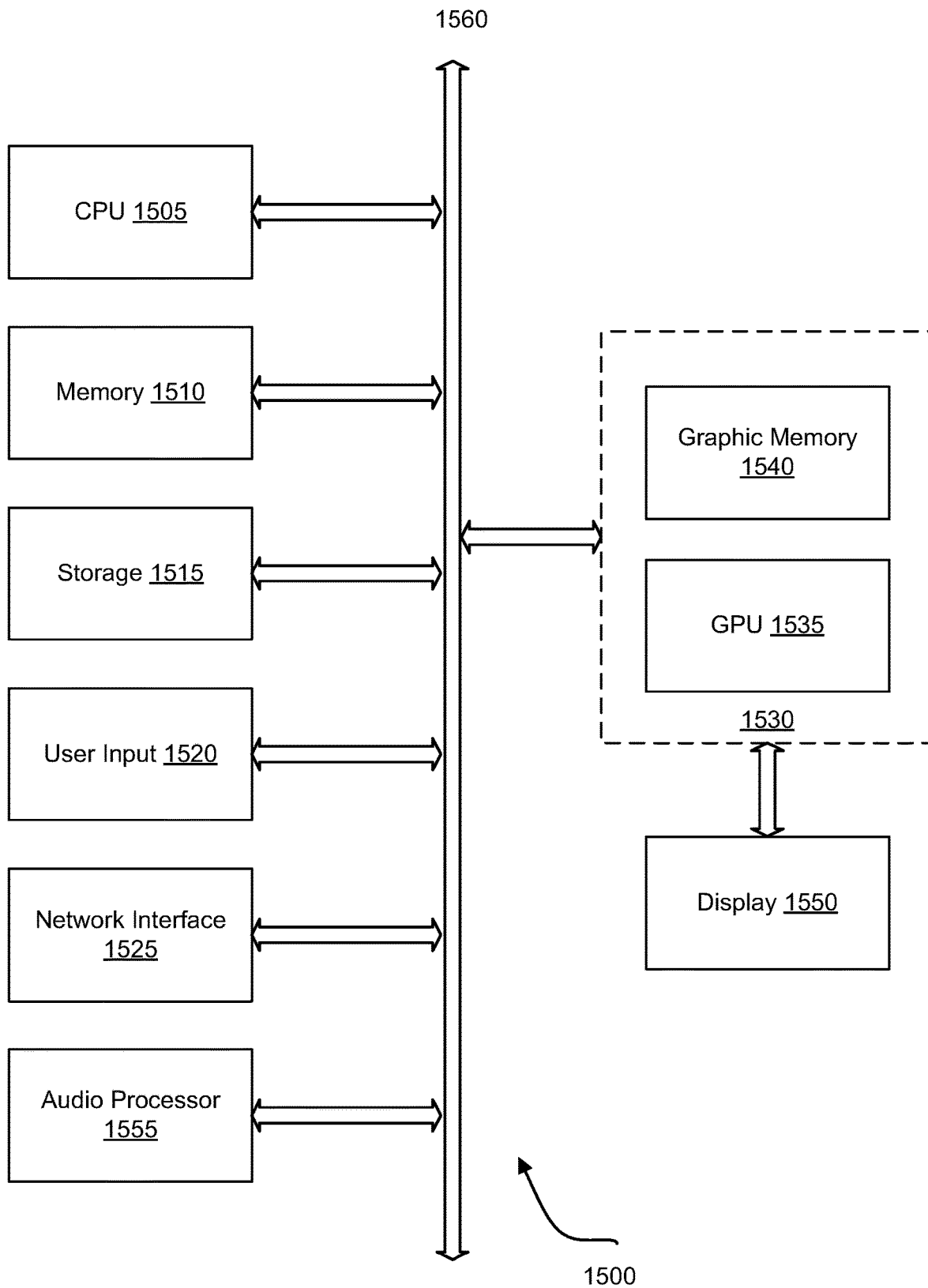
FIG. 13 illustrates an example of a hardware system suitable for implementing a computer system, according to embodiments of the present disclosure.

FIG. 13 illustrates an example of a hardware system suitable for implementing a computer system, according to embodiments of the present disclosure. The computer system 1300 represents, for example, a video game system, a backend set of servers, or other types of a computer system. The computer system 1300 includes a central processing unit (CPU) 1305 for running software applications and optionally an operating system. The CPU 1305 may be made up of one or more homogeneous or heterogeneous processing cores. Memory 1310 stores applications and data for use by the CPU 1305. Storage 1315 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1320 communicate user inputs from one or more users to the computer system 1300, examples of which may include keyboards, mice, joysticks, touch pads, touch screens, still or video cameras, and/or microphones. Network interface 1325 allows the computer system 1300 to communicate with other computer systems via an electronic communications network, and may include wired or wireless communication over local area networks and wide area networks such as the Internet. An audio processor 1355 is adapted to generate analog or digital audio output from instructions and/or data provided by the CPU 1305, memory 1310, and/or storage 1315. The components of computer system 1300, including the CPU 1305, memory 1310, data storage 1315, user input devices 1320, network interface 1325, and audio processor 1355 are connected via one or more data buses 1360.

A graphics subsystem 1330 is further connected with the data bus 1360 and the components of the computer system 1300. The graphics subsystem 1330 includes a graphics processing unit (GPU) 1335 and graphics memory 1340. The graphics memory 1340 includes a display memory (e.g., a frame buffer) used for storing pixel data for each pixel of an output image. The graphics memory 1340 can be integrated in the same device as the GPU 1335, connected as a separate device with the GPU 1335, and/or implemented within the memory 1310. Pixel data can be provided to the graphics memory 1340 directly from the CPU 1305. Alternatively, the CPU 1305 provides the GPU 1335 with data and/or instructions defining the desired output images, from which the GPU 1335 generates the pixel data of one or more output images. The data and/or instructions defining the desired output images can be stored in the memory 1310 and/or graphics memory 1340. In an embodiment, the GPU 1335 includes 3D rendering capabilities for generating pixel data for output images from instructions and data defining the geometry, lighting, shading, texturing, motion, and/or camera parameters for a scene. The GPU 1335 can further include one or more programmable execution units capable of executing shader programs.

The graphics subsystem 1330 periodically outputs pixel data for an image from the graphics memory 1340 to be displayed on the display device 1350. The display device 1350 can be any device capable of displaying visual information in response to a signal from the computer system 1300, including CRT, LCD, plasma, and OLED displays. The computer system 1300 can provide the display device 1350 with an analog or digital signal.

In accordance with various embodiments, the CPU 1305 is one or more general-purpose microprocessors having one or more processing cores. Further embodiments can be implemented using one or more CPUs 1305 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for caching and presenting an interactive menu for disparate applications, the method implemented by a computer system, the method comprising:
    providing data templates that define arrangements of user interface (UI) elements to be shown in an interactive menu and data to be cached for respective applications, each data template identifying a type of content to be cached for a respective application and associating the type to one or more presentation states in the interactive menu;
    determining, by a menu application of the computer system, a first data template for a first target application of the computer system;
    storing, by the menu application and based on the first data template, data of the first target application in a cache of the menu application, the data comprising first content or a first uniform resource identifier (URI) of the first content, the data further comprising second content or a second URI of the second content, the first content being of a first type identified in the first data template and associated in the first data template with a first presentation state and a second presentation state, the second content being of a second type identified in the first data template and associated in the first data template with the second presentation state;
    receiving, from an input device, a user input requesting the interactive menu;
    presenting, by the menu application, the interactive menu on a display, the interactive menu comprising windows that are presented in the first presentation state and that correspond to the respective applications, the windows comprising a first window that corresponds to the first target application and that is populated with the first content based on the data from the cache of the menu application and based on the first data template;
    receiving, from the input device, a user interaction with the first window requesting the second presentation state;
    generating, by the menu application, a copy of the data of the first target application from the cache based on the user interaction with the first window;
    sending, by the menu application to a window application of the computer system, the copy of the data of the first target application, the window application being different from the menu application and the first target application; and
    presenting, by the window application and on the display, a second window that corresponds to the first target application, the second window presented in the second presentation state and populated by the window application with the first content and the second content based on the copy of the data and based on the first data template.

2. The method of claim 1, further comprising:
    fetching, by a computing service of the menu application and prior to receiving the user input, the data of the first target application and additional data of other target applications of the computer system based on the data templates, the other respective applications corresponding to remaining ones of the windows; and
    storing, by the computing service, the data and the additional data in the cache of the menu application.

3. The method of claim 2, wherein presenting the interactive menu comprises:
    populating the first window with the first content based on the first data template defined for the first target application;
    determining third content for a third window of the windows based on the additional data, the third window corresponding to a second target application that is different from the first target application; and
    populating the third window with the third content based on a second data template defined for the second target application.

4. The method of claim 2, wherein the data of the first target application is fetched based on an event, wherein the event comprises at least one of: a change to an operational state of the first target application, new data generated by the first target application, or new data being sent to the first target application.

5. The method of claim 1, further comprising:
    launching, upon a user login to the computer system and prior to receiving the user input, the menu application and the window application each in a corresponding background process of the computer system; and
    running, upon receiving the user input, the menu application in a corresponding foreground process while the window application remains running in the corresponding background process.

6. The method of claim 5, further comprising:
    running, upon receiving the user interaction with the first window, the window application in a corresponding foreground process.

7. The method of claim 6, wherein launching the window application comprises instantiating a logical container for the window application, the logical container having parameters common to the respective applications, and wherein running the window application comprises sending, by the menu application to the window application, parameters specific to the first target application.

8. The method of claim 6, further comprising:
    presenting, by the menu application upon receiving the user interaction with the first window and prior to running the window application in the corresponding foreground process, the first window in the second presentation state;

presenting, by the window application upon the window application being ran in the corresponding foreground process, the second window in an overlay over the first window; and terminating, by the menu application, the presentation of the first window.

9. The method of claim 1, wherein only the copy of the data is sent to the window application and no copy of additional data of another target application from the cache is sent to the window application.

10. The method of claim 1, further comprising:
determining, by the menu application and while the window application is presenting the second window, a change from the cache to the data;
sending, by the menu application to the window application, a copy of the change from the cache; and
updating, by the window application, the first content in the second window based on the copy of the change.

11. The method of claim 1, further comprising:
presenting, by the menu application, a command option, the command option presented next to the first window and being selectable to generate a command that controls a presentation of media content of the first target application.

12. The method claim 11, further comprising:
receiving, by the menu application, a user selection of the command option;
sending, by the menu application to the window application and based on the user selection, parameters specific to the first target application; and
sending, by the menu application to the window application upon the window application being ran based on the parameters, the command.

13. The method of claim 1, further comprising:
presenting, by the window application, a command option, the command option presented next to the second window and being selectable to generate a command that controls a presentation of media content of the first target application.

14. The method of claim 13, further comprising:
receiving, by the window application, a user selection of the command option; and
controlling, by the window application, a presentation of the media content of the first target application.

15. A computer system comprising:
one or more processors; and
one or more memories storing computer-readable instructions that, upon execution by the one or more processors, configure the computer system to:
provide data templates that define arrangements of user interface (UI) elements to be shown in an interactive menu and data to be cached for respective applications, each data template identifying a type of content to be cached for a respective application and associating the type to one or more presentation states in the interactive menu;
determine, by a menu application of the computer system, a first data template for a first target application of the computer system;
store, by the menu application and based on the first data template, data of the first target application in a cache of the menu application, the data comprising first content or a first uniform resource identifier (URI) of the first content, the data further comprising second content or a second URI of the second content, the first content being of a first type identified in the first data template and associated in the first data template with the first data template with a first presentation state and a second presentation state, the second content being of a second type identified in the first data template and associated in the first data template with the second presentation state;
receive, from an input device, a user input requesting the interactive menu;
present, by the menu application, the interactive menu on a display, the interactive menu comprising windows that are presented in the first presentation state and that correspond to the respective applications, the windows comprising a first window that corresponds to the first target application and that is populated with the first content based on the data from the cache of the menu application and based on the first data template;
receive, from the input device, a user interaction with the first window requesting the second presentation state;
generate, by the menu application, a copy of the data of the first target application from the cache based on the user interaction with the first window;
send, by the menu application to a window application of the computer system, the copy of the data of the first target application, the window application being different from the menu application and the first target application; and
present, by the window application and on the display, a second window that corresponds to the first target application, the second window presented in the second presentation state and populated by the window application with the first content and the second content based on the copy of the data and based on the first data template.

16. One or more non-transitory computer-readable media storing computer-readable instructions that, upon execution on a computer system, cause the computer system to perform operations comprising:
providing data templates that define arrangements of user interface (UI) elements to be shown in an interactive menu and data to be cached for respective applications, each data template identifying a type of content to be cached for a respective application and associating the type to one or more presentations states in the interactive menu;
determining, by a menu application of the computer system, a first data template for a first target application of the computer system;
storing, by the menu application and based on the first data template, data of the first target application in a cache of the menu application, the data comprising first content or a first uniform resource identifier (URI) of the first content, the data further comprising second content or a second URI of the second content, the first content being of a first type identified in the first data template and associated in the first data template with a first presentation state and a second presentation state, the second content being of a second type identified in the first data template and associated in the first data template with the second presentation state, the cache storing different data for different target applications of the computer system based on different templates defined for the different target applications;
receiving, from an input device, a user input requesting an interactive menu;
presenting, by the menu application, the interactive menu on a display, the interactive menu comprising windows that are presented in the first presentation state and that correspond to the respective applications, the windows comprising a first window that corresponds to the first target application and that is populated with the first content based on the data from the cache of the menu application and based on the first data template;

receiving, from the input device, a user interaction with the first window requesting the second presentation state;

generating, by the menu application, a copy of the data of the first target application from the cache based on the user interaction with the first window;

sending, by the menu application to a window application of the computer system, the copy of the data of the first target application, the window application being different from the menu application and the first target application; and presenting, by the window application and on the display, a second window that corresponds to the first target application, the second window presented in the second presentation state and populated by the window application with the first content and the second content based on the copy of the data and based on the first data template.

17. The method of claim 1 further comprising:

prior to receiving the user interaction with the first window, receiving, by the menu application, interacting user interaction with the interactive menu; and presenting, by the menu application based on the user interaction with the first window, the first window in a third presentation state.

18. The method of claim 17, wherein the first presentation state is a non-focus glance presentation state, and wherein the first content comprises at least one of: a title of the first target application, an icon of the first target application, or media content of the first target application.

19. The method of claim 18, wherein the third presentation state is a focused presentation state, wherein a size of the first window is increased in the third presentation state relative to the first presentation state, and wherein the first window is populated in the third presentation state with the at least one of: the title, the icon, or the media content and with a selectable action on the media content or the first window.

20. The method of claim 19, wherein the second presentation state is an expanded presentation state, wherein a size of the second window is larger than the size of the first window in the focused presentation state, and wherein the second window is populated with the at least one of: the title, the icon, or the media content, the selectable action, and a description of the first target application or the selectable action.

21. The method of claim 20, wherein:

each of the first presentation state, the second presentation state, and a third presentation state is configured to present different elements according to a different pattern; and the first data template defines the different patterns of the first presentation state, the second presentation state, and the third presentation state.

22. The method of claim 21, wherein:

the first presentation state is populated by fewer elements than the second presentation state; and the second presentation state is populated by fewer elements than the third presentation state.

* * * * *